US009020048B2

United States Patent
Greene et al.

(10) Patent No.: US 9,020,048 B2
(45) Date of Patent: Apr. 28, 2015

(54) DYNAMICALLY MODIFYING VIDEO AND CODING BEHAVIOR

(75) Inventors: Jeremy A. Greene, Acton, MA (US); Victor Odryna, Acton, MA (US); Ali Benamara, Nashua, NH (US)

(73) Assignee: Zeevee, Inc., Littleton, MA (US)

( * ) Notice: Subject to any disclaimer, the term of this patent is extended or adjusted under 35 U.S.C. 154(b) by 757 days.

(21) Appl. No.: 12/433,095

(22) Filed: Apr. 30, 2009

(65) Prior Publication Data

US 2009/0274219 A1 Nov. 5, 2009

Related U.S. Application Data

(60) Provisional application No. 61/126,096, filed on Apr. 30, 2008.

(51) Int. Cl.
*H04B 1/66* (2006.01)
*H04N 7/12* (2006.01)
*H04N 11/02* (2006.01)
*H04N 11/04* (2006.01)
*H04N 19/152* (2014.01)
*H04N 19/115* (2014.01)
*H04N 19/61* (2014.01)
*H04N 19/124* (2014.01)
*H04N 19/136* (2014.01)

(52) U.S. Cl.
CPC ........... *H04N 19/152* (2014.11); *H04N 19/115* (2014.11); *H04N 19/61* (2014.11); *H04N 19/124* (2014.11); *H04N 19/136* (2014.11)

(58) Field of Classification Search
USPC ............................. 375/240.26, 240.12, 240.16
See application file for complete search history.

(56) References Cited

U.S. PATENT DOCUMENTS

| | | | | |
|---|---|---|---|---|
| 6,654,417 B1 * | 11/2003 | Hui | ........................ | 375/240.03 |
| 7,079,581 B2 | 7/2006 | Noh et al. | | |
| 7,936,819 B2 * | 5/2011 | Craig et al. | .............. | 375/240.12 |
| 2003/0147561 A1 * | 8/2003 | Faibish et al. | .................. | 382/245 |
| 2004/0205213 A1 * | 10/2004 | Paz et al. | ........................ | 709/231 |
| 2006/0013235 A1 * | 1/2006 | Farnham | ........................ | 370/401 |
| 2006/0227250 A1 * | 10/2006 | Barbieri | ........................ | 348/700 |
| 2007/0036227 A1 * | 2/2007 | Ishtiaq et al. | ............. | 375/240.26 |
| 2007/0133705 A1 * | 6/2007 | Tzannes | ........................ | 375/260 |
| 2007/0280349 A1 | 12/2007 | Prieto et al. | | |
| 2008/0037656 A1 | 2/2008 | Hannuksela | | |
| 2009/0118017 A1 * | 5/2009 | Perlman et al. | ................. | 463/42 |
| 2010/0135412 A1 * | 6/2010 | Wang et al. | .............. | 375/240.16 |

\* cited by examiner

*Primary Examiner* — Mehrdad Dastouri
*Assistant Examiner* — Kristin Dobbs
(74) *Attorney, Agent, or Firm* — Preti Flaherty Beliveau & Pachios LLP

(57) ABSTRACT

A system and method that provides a connection path between a video source such as a personal computer (PC) and a high-definition television (HDTV). A control is provided for varying a quality level of a video signal with respect to latency of activities provided through the video signal channel. Output picture quality versus latency is adjusted on a dynamic basis. Observed mouse activities causes the output picture quality to be decreased rapidly with an attendant decrease in latency. A decrease in output picture quality and latency is maintained until the occurrence of a particular event, such as the expiration of a time interval from a last observed mouse event. If a limited number of mouse events are observed, then the output picture quality is increased to a point at which the limited mouse activity can be accommodated with an acceptable level of latency. If limited or no mouse events are observed for a given period of time, the output picture quality is increased, either rapidly or gradually, until output picture quality is restored or another mouse event is observed.

27 Claims, 11 Drawing Sheets

DYNAMICALLY MODIFYING VIDEO AND CODING BEHAVIOR

CROSS REFERENCE TO RELATED APPLICATIONS

This application claims benefit of U.S. Provisional Patent Application No. 61/126,096 filed Apr. 30, 2008 entitled SYSTEM AND METHOD FOR LOCAL BROADCASTING.

STATEMENT REGARDING FEDERALLY SPONSORED RESEARCH OR DEVELOPMENT

Not applicable

BACKGROUND OF THE INVENTION

The present invention relates generally to systems and methods of local broadcasting, and more specifically to providing a media broadcast signal to a receiver as derived from a personal computer or any other suitable high-definition video source.

It is generally preferable to present electronic media with higher fidelity than is available on a personal computer (PC). As used herein, the term PC refers to any type of personal computer, including IBM® type PCs, Apple® Macintosh PCs, and any other type of computer that is typically employed for use by an individual. When providing video as the electronic media, which includes image and audio media, it is generally the case that preferable output picture quality can be obtained when the video is presented on a television set rather than on a PC, especially if the television can display in high-definition. As used herein, the term video is meant to include sequences of images or video frames in conjunction with audio that may or may not be synchronized with the image frames. Various sources of video are generally available for home video viewing, such as digital video disks (or digital versatile disks, that is, DVDs) and DVD players, cable or satellite television broadcast systems, personal computers, digital cameras, networks such as traditional telephone networks or packet switched networks such as the Internet, as well as other types of video sourcing systems. A video sourcing system gaining favor for distribution of video media involves the use of the Internet with multiple video sources being available for selection for download by a user to a PC. Typically, video monitors connected to a PC are less esthetically pleasing in rendering video than a television set, and in particular a high-definition television (HDTV) set. In addition, a PC is typically designed for use by a single person so that more than one person wishing to view video content at the same time on a PC becomes less desirable. Accordingly, while the PC has access to vast media sources, it is not a preferred presentation format. There is presently no readily available or simple solution for providing Internet connectivity to a conventional or high-definition television.

HDTVs in particular, have become popular with homeowners for creating environments in which viewers can spend one or more hours viewing video content. For example, a "media room" that has an HDTV also typically has comfortable seating arrangements, high-quality sound systems and other features that improve the experience of the media presentation. However, the transfer of media content from a PC to a media room presentation system, including high-definition television and high-quality audio systems, is relatively cumbersome. In addition, while a PC could be stationed in a media room to have the PC connect to an HDTV, for example, to provide a media feed to the HDTV, it is usually desirable to avoid such an arrangement. For example, having a PC in a media room and prevent the use of a PC and an HDTV or high-quality audio system from being used at a same time, that is, for multiple persons. Moreover, PCs typically offer unwanted distractions, including lights, peripherals and fans that can add noise to an otherwise aesthetically pleasing media presentation environment.

BRIEF SUMMARY OF THE INVENTION

In accordance with the present invention, a system and method is disclosed that provides a connection path between a video source and a television, particularly, between a personal computer (PC) and a high-definition television (HDTV). For example, the disclosed system and method permit video content downloaded on a PC to be presented on an HDTV with an attendant audio system. The disclosed system is coupled to a video and audio output of the PC and to a coaxial cable input for the HDTV, and provides various features for switching video between the PC and the HDTV.

According to an exemplary embodiment of the disclosed system and method, a control is provided for varying a quality level of a video signal with respect to latency of activities provided through the video signal channel. High-definition digital encoding typically uses the MPEG-2 encoding scheme, which is computationally intensive. When MPEG-2 encoding is provided in real-time, output picture quality can be improved by analyzing a greater number of frames of a video input. The computationally intensive encoding, coupled with an increased number of video frames to analyze, can cause a higher than normal level of latency between a PC as the video source and the video displayed on an HDTV. Such latency can pose a difficulty if a user wishes to interact with the video display, such as often occurs with the use of a cursor input provided through a mouse action at the PC. In accordance with the disclosed system and method, the quality level of the MPEG-2 video is decreased to reduce the attendant latency to permit other interactive video events to occur in correspondence with actual user activities. According to one aspect, the quality level of the MPEG-2 video is decreased by dropping video frames to permit an increase in bandwidth for activities being addressed to the video display. According to another aspect, output picture quality versus latency is adjusted on a dynamic basis. For example, observed mouse activities causes the output picture quality to be decreased rapidly with an attendant decrease in latency. A decrease in output picture quality and latency is maintained until the occurrence of a particular event, such as the expiration of a time interval from a last observed mouse event. Alternately, or in addition, if a limited number of mouse events are observed, the output picture quality is increased to a point at which the limited mouse activity can be accommodated with an acceptable level of latency. If limited or no mouse events are observed for a given period of time, the output picture quality is increased, either rapidly or gradually, until output picture quality is restored or another mouse event is observed.

Other features, functions, and aspects of the invention will be evident from the Detailed Description of the Invention that follows.

BRIEF DESCRIPTION OF THE SEVERAL VIEWS OF THE DRAWINGS

The invention will be more fully understood with reference to the following Detailed Description of the Invention in conjunction with the drawings of which.

DETAILED DESCRIPTION OF THE INVENTION

The disclosure of U.S. Provisional Patent Application No. 61/126,096 filed Apr. 30, 2008 entitled SYSTEM AND METHOD FOR LOCAL BROADCASTING is incorporated herein by reference in its entirety.

Figure 1:
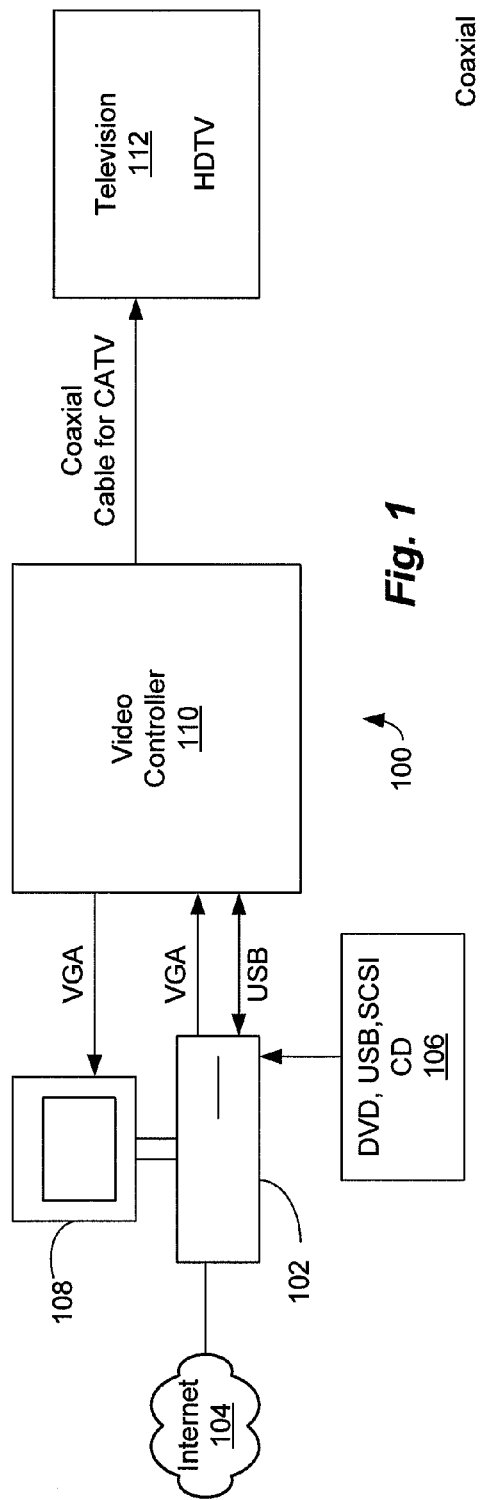
FIG. 1 is a block diagram illustrating a local broadcast system, according to the present invention.

FIG. 1 depicts an illustrative embodiment of the disclosed system and method provided as video system 100. In video system 100, a high-definition (HD) video source such as a personal computer (PC) 102 has various video input sources that include a network, e.g., an Internet 104 and a peripheral input shown generally as input 106. Video content provided from sources 104 or 106 may include image frames, audio that is synchronized or not synchronized with the image frames or other various combinations of image and audio media, referred to herein collectively as video. Source 106 may include various video media types accessible by PC 102, including DVDs, MP3s, CDs, and any other type of video media, including broadcast and downloadable media such as satellite or modem delivered video media. In general, PC 102 acts as a point source for video that is to be displayed on a video display of a television, preferably a high-definition television (HDTV), as well as being provided to a high-quality sound system in a given video presentation mode. A video controller 110 is disposed between PC 102 and a television 112, which can be an HDTV. Video controller 110 connects to PC 102 using a VGA path loop back, in which video controller 110 resides between a VGA connector for PC 102 and a VGA connector for display monitor 108 of PC 102. With this configuration, video controller 110 can intercept output from the VGA connector of PC 102 or display monitor 108, and provide commands and information to the VGA connector of PC 102 or display monitor 108.

Video controller 110 is also connected to PC 102 through a USB port to provide a serial control pathway between PC 102 and video controller 110. In addition, the USB port is used to obtain high-quality audio output from PC 102 that can be passed to television 112.

Video controller 110 is coupled to television 112 with a coaxial cable, which is the same cable used to provide cable TV (CATV) signals to television 112. Video controller 110 broadcasts a video signal onto the coaxial cable, which is picked up for presentation using television 112 on a selected channel, in accordance with an exemplary embodiment. By using the coaxial cable, PC 102 and television 112 can be located remotely from each other in a local area, since the coaxial cable can carry high-quality video signals over substantial distances without significant degradation.

Figure 2:
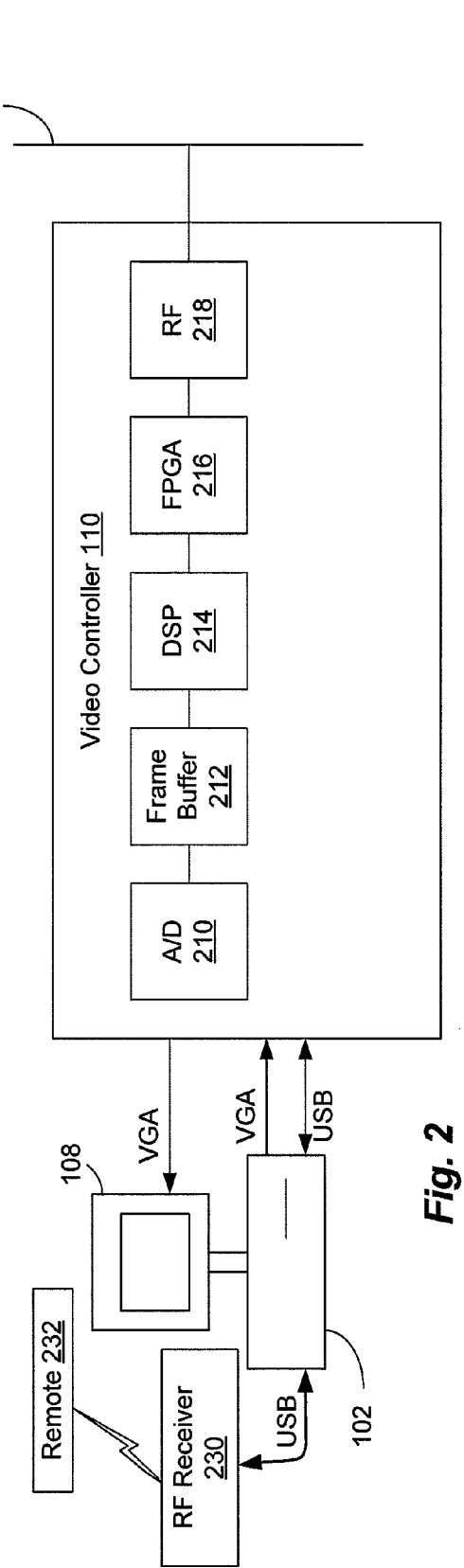
FIG. 2 is a block diagram illustrating a controller included in the system of FIG. 1.

As shown in FIG. 2, video controller 110 receives image and audio data from a VGA connector and a USB connector, respectively, on PC 102. The signals from the VGA and USB connector of PC 102 are fed to video controller 110, where they are converted from analog to digital with analog to digital converter (ADC) 210. The image and audio data are stored in a frame buffer 212 as a queue for supplying video to digital signal processor (DSP) 214 for rendering high-definition video. The output high-definition video from DSP 214 is provided to a field programmable gate array (FPGA) 216, where simple and fast functions are provided for manipulating the HD video stream. For example, FPGA 216 may provide final video transport stream wrapping, and other functions for delivering high-definition video to an HDTV. The transport stream containing the HD video is delivered to radio frequency (RF) section 218, where the video is modulated onto a channel for broadcast over coaxial cable 220. The channel onto which RF section 218 modulates the video transport stream carrying the HD video can be selected in accordance with a particular algorithm, as discussed in greater detail below.

PC 102 can be remotely controlled with an RF capable remote control 232. Remote control 232 includes an RF transmitter that can communicate with an RF receiver 230 that is coupled to PC 102 through a USB port. Remote 232 can be used as the TV input source to cause a mode switch from PC mode to TV mode. In addition, remote control 232 is equipped with input devices that can control input to PC 102. Accordingly, using remote control 232, the user can provide input to PC 102 to cause a switch to PC mode, or can provide input for television 112 to cause a mode switch to TV mode. The various different inputs provided by remote control 232 are delivered to PC 102 through RF receiver 230, and detected by video controller 110 to cause mode changes or other control function implementations. Thus, a user may switch between different modes available from video controller 110, even if not in the vicinity of video controller 110, as may be common when PC 102 and television 112 are located in separate areas of a premises, for example. By using remote control 232, a user can change between a video presentation mode on television 112, and viewing a screen provided by PC 102 as a PC display on television 112, without having to be present at either PC 102 or television 112.

Mode Switching

In accordance with an exemplary embodiment of the disclosed system and method, video controller 110 provides for a mode change between PC display monitor 108 and the video display of television 112. The mode change causes a switch between video resolution of the video signal output from PC 102, such that the video resolution is suitable either for PC display monitor 108 or the video display of television 112. The mode switch also causes an audio signal to be switched between an audio output for PC 102, that is, PC speakers, and an audio output from PC 102 over a USB port supported by PC 102.

In accordance with an exemplary embodiment, a user receives active video directed to and optimized for PC display monitor 108 in one mode, referred to as the PC mode, and receives active video directed to and optimized for television 112 in another mode, referred to as the TV mode. When the user is in PC mode, the video resolution provided by PC 102 is selected and optimized for display monitor 108. When the user is in TV mode, the resolution provided in the video output of PC 102 is selected and optimized for the video resolution of television 112. Some examples of video resolution used with PC display monitor 108 include VGA: 640×480; XGA: 1024×768; and, SXGA: 1280×1024. Examples of available resolutions for HDTV include 1280×720, known as 720p60 in which "p" stands for progressive and "60" stands for 60 frames a second, and 1280×1024, known as 1080i60 in which "i" stands for interlaced and "60" refers to 60 fields (half of a frame) per second, meaning that half an image is sent 60 times a second or a full image is sent 30 times a second. The image is sent interlaced, or with every other line being sent for each frame.

A typical aspect ratio of PC display monitor 108 can be 5:4, while a typical aspect ratio of television 112 can be 16:9. It is generally difficult to translate between the resolutions available in PC 102 and the resolution used by television 112. According to an embodiment of the disclosed system and method, PC 102 is commanded to change resolution of the signal provided to the VGA connector for use with either PC display monitor 108 or the video display of television 112.

Accordingly, video controller 110 commands PC 102 to select a video resolution for display monitor 108 in PC mode, and to select a video resolution suitable for the video display of television 112 in TV mode. Video controller 110 performs a mode change by capturing and storing the EDID from PC display monitor 108 to have a record of the video resolution desired by display monitor 108. When system 100 is in PC mode, video controller 110 provides the captured and stored EDID from display monitor 108 to PC 102 and causes a video resolution change. The video resolution change is caused by providing a command to PC 102 to read the EDID provided by video controller 110 and implement the video resolution called for by the information in the EDID.

When system 100 changes to TV mode, video controller 110 provides an EDID suitable for changing video resolution output by PC 102 to a format used by television 112. If a switch to PC mode is made, controller 110 provides the captured and stored EDID from PC display monitor 108 to PC 102 and forces a video resolution change so that the output video resolution from PC 102 matches that of display monitor 108.

Merged EDID

According to another aspect of the disclosed system and method, a merged EDID is used for video switching, especially when switching between PC mode and TV mode. The technique uses a display data channel (DDC), which is a digital connection between a computer display monitor and a graphics adapter that allows the display to communicate its specification to the adapter. DDC is a standard that was created by the Video Electronics Standards Association (VESA). The DDC link is carried on three pins in a 15 pin VGA connector, a DVI (Digital Visual Interface) connector or an HDMI (High-Definition Multimedia Interface) connector, and represent data, clock and ground signals. The display monitor has a non-volatile memory, such as a ROM, that is programmed by the manufacturer, for example, with information about the graphics modes that the monitor can display. The data in the memory of the display monitor is provided in a standard structure format referred to as the EDID.

The ATSC (Advanced Television Systems Committee) television standard encoding supports 480P, 720P and 1080I. In addition, PC 102 may be able to support a number of different types of resolution, especially from a set of preferred resolutions. According to one embodiment, the disclosed system and method reads the EDID from display monitor 108 and appends HD video resolution mode prior to submission of the block of modes to the PC. The available modes are then requested from the PC, to determine what modes the graphic card can support. The supported modes can be provided to the user in an initial configuration of system 100 to permit the user to choose among supported high-definition video resolutions, for example. In addition, controller 110 can determine the supported video resolution modes available in the graphics adapter of PC 102. In addition, controller 110 can program the non-volatile memory of display monitor 108 with video resolutions, such as by storing the video resolutions in an EPROM provided in display monitor 108 in accordance with DDC standards. In such an instance, display monitor 108 can be used to return desired video resolutions for submission to PC 102 to cause a video resolution mode change.

PC display monitor 108 has a control channel called DDC2, defined by the VESA standard. Display monitor 108 sends the EDID over DDC2 to PC 102 at certain times, such as when requested. The EDID provided by display monitor 108 contains all the resolutions supported by the monitor. Typically, many different types of resolutions are supported.

Some applications may force some lower resolutions. In this instance, controller 110 should provide a true "multi-sync" display, i.e., the ability to accept many different input resolutions. For example, controller 110 should be able to sync a wide variety of PC video resolutions and perform scaling without a significant impact on output picture quality.

Note that the multi-sync support does not have to produce the best video. Providing "multi-sync" capability in controller 110 may cause television 112 to operate in an initial, less preferable mode to start with (non-HD resolutions).

One approach for implementing multi-sync is to choose an output video stream resolution that is larger than the input stream resolution, centering the input video stream within the larger output stream image. The input video may effectively overlay the output image, which, for example, may be entirely black. Specifically, any input resolution with the horizontal resolution below 640 pixels and a vertical resolution of less than 480 is displayed as a 640×480 image with black space on the top, bottom, and sides, as needed. Similarly, for any input greater than 640×480 and equal to or less than 1280×720, the output is displayed as a 1280×720 image with black space on the top, bottom, and sides, as needed; and, for any input greater than 1280×720 and equal to or less than 1920×1080, the output is displayed as a 1920×1080 image with black space on the top, bottom, and sides, as needed.

The table below illustrates an approach for implementing multi-sync that uses image scaling, in which computer resolutions are displayed in full on television 112 in high-definition mode. A set of resolution conversion operations may be used.

TABLE

|  |  | VGA 640 × 480 | XGA 1024 × 768 | SXGA 1280 × 1024 | UXGA 1600 × 1200 | WXGA 1366 × 768 | WSXGA 1680 × 1050 | WUXGA 1920 × 1200 |
|---|---|---|---|---|---|---|---|---|
| 720p | Final | 640 × 480 | 960 × 720 | 900 × 720 | 960 × 720 | 1280 × 720 | 1152 × 720 | 1152 × 720 |
|  | Hor. | Inset | Rescale | Rescale | Rescale | Rescale | Rescale | Rescale |
|  | Ver. | Inset | Rescale | Rescale | Rescale | Rescale | Rescale | Rescale |
| 1080i | Final | 640 × 480 | 1024 × 768 | 1280 × 1024 | 1440 × 1080 | 1366 × 768 | 1680 × 1050 | 1728 × 1080 |
|  | Hor. | Inset | Inset | Inset | Rescale | Inset | Inset | Rescale |
|  | Ver. | Inset | Inset | Inset | Rescale | Inset | Inset | Rescale |

Horizontal Filters:
1) 1024→960
2) 1280→900
3) 1600→960
4) 1366→1280
5) 1680→1152
6) 1920→1152
7) 1600→1440
8) 1920→1728

Vertical Filters:
1) 1200→720
2) 768→720
3) 1024→720
4) 1050→720
5) 1200→1080

Because ATSC encoding supports only 480P, 720P and 1080I, converting or scaling all the possible PC resolutions to one of the three supported ATSC encodings is not trivial, and usually produces unwanted video artifacts. Accordingly, controller 110 forces PC 102 into one of the high-definition video resolutions when TV 112 is in use. Controller 110 generates EDID information with 720P and 1080I and causes PC 102 to read the new EDID information. Controller 110 can query PC 102 to obtain supported video resolutions available with the video card installed in PC 102.

Controller 110 configures video resolution by retrieving an intersection of video resolutions available from display monitor 108 and video resolutions available from a video adaptor in PC 102. If available, controller 110 may offer an option for the user to select among HD resolutions, such as 720P or 1080I.

Controller 110 determines the resolution supported by the video adapter in PC 102 as well as PC display monitor 108. The configuration read from display monitor 108 is saved and controller 110 supplies video resolution information to PC 102 for HD video resolution including 720P and 1080I. Controller 110 then forces a read operation by PC 102, and then determines whether PC 102 can produce HD resolution, such as 720P or 1080I. In this way, controller 110 can determine the video resolution available in PC 102, in particular for use with a high-definition television display.

Automatic Mode Switching

When activity occurs at PC 102, such as a mouse movement, keyboard input, or other PC device input, controller 110 changes to PC mode and provides the appropriate video resolution command to PC 102 to properly display in, for example, a 5:4 aspect ratio on PC display monitor 108 in accordance with the resolution indicated to be available from display monitor 108. When input is provided to TV 112 such as with a remote, which may be a customized remote for switching modes between PC mode and TV mode, controller 110 detects the input and causes a mode change to TV mode.

According to an exemplary embodiment, controller 110 can be configured to recognize different actions for different input criteria. For example, input provided by a mouse connected to PC 102 can be ignored for the purposes of changing modes.

Remote control 232 may be used to switch between TV mode and PC mode. In addition, remote control 232 may also be used to control PC functions from the video display of television 112. For example, remote 232 has a mouse pad type interface that permits a user to remotely control a mouse input for PC 102, so that the user can manipulate the functionality of PC 102 using television 112 as a display monitor. In addition, remote 232 may be used to control television 112, such as through an IR port or a set top box used in conjunction with television 112.

Changing modes between PC mode and TV mode can be viewed as a state machine state change, in which the states are TV mode, PC mode or do nothing. A state change PC mode to TV mode occurs with PC input or input from remote 232 to cause a change to PC mode. A state change from PC mode to TV mode occurs with an appropriate input from remote 232. Video controller 110 can be put in a waiting, or a do nothing mode, in which it simply passes video from PC 102 to TV 112, without resolution changes. The do nothing state can be entered from PC mode or TV mode, and conversely, TV mode or PC mode can be reached from the state of do nothing. Entering TV mode, due to an input with a TV associated device, such a remote 232, causes a number of actions, as described above. For example, the video resolution provided by PC 102 is captured and saved. A resolution list can be created that includes a resolution suitable for PC display monitor 108 and available in PC 102, and a resolution suitable for HDTV video. When entering TV mode, the merged video resolution list is provided to PC 102, and a DDC read is forced by sending a command to PC 102. PC 102 responds with video resolution suitable for high-definition television. Video controller 110 also sends commands through the USB port to PC 102 to install an audio device to support audio broadcasting to television 112. If PC display monitor 108 does not support television type resolution, display monitor 108 is turned off. In addition, display monitor 108 is turned off or provided with a display such as a message when privacy mode is enabled, as discussed in greater detail below.

When changing state to PC mode, such as may be prompted by a type of input at PC 102, or a specialized input from remote 232, a number of actions specific to PC mode occur. For example, a captured and saved video resolution obtained from display monitor 108 is provided to PC 102, and a DDC read is forced. PC 102 is thus configured to have a video resolution suitable for display monitor 108. In addition, controller 110 sends control commands over the USB port to PC 102 to disable and uninstall the audio device used in support of video being provided to television 112. In addition, a video feed to television 112 is disabled if a privacy mode is enabled, as discussed in great detail below. Finally, controller 110 causes display monitor 108 to be enabled if it is in a disabled or turned off state.

Figure 3:
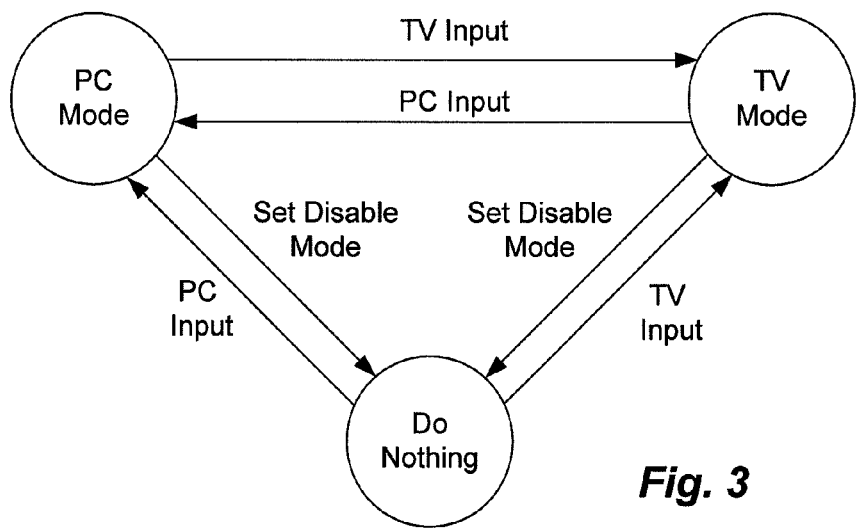
FIG. 3 is a state diagram illustrating a method of mode switching implemented in the system of FIG. 1.

FIG. 3 depicts an illustrative state machine transition diagram 300. As explained above, mode changes viewed as state changes can occur between PC mode and TV mode with inputs detected from the respective devices. In addition, a do nothing state is provided when controller 110 is disabled from mode switching. The do nothing state can be reached from PC mode or TV mode, and can be achieved by, for example, changing a setting in the configuration of controller 110.

Figure 4:
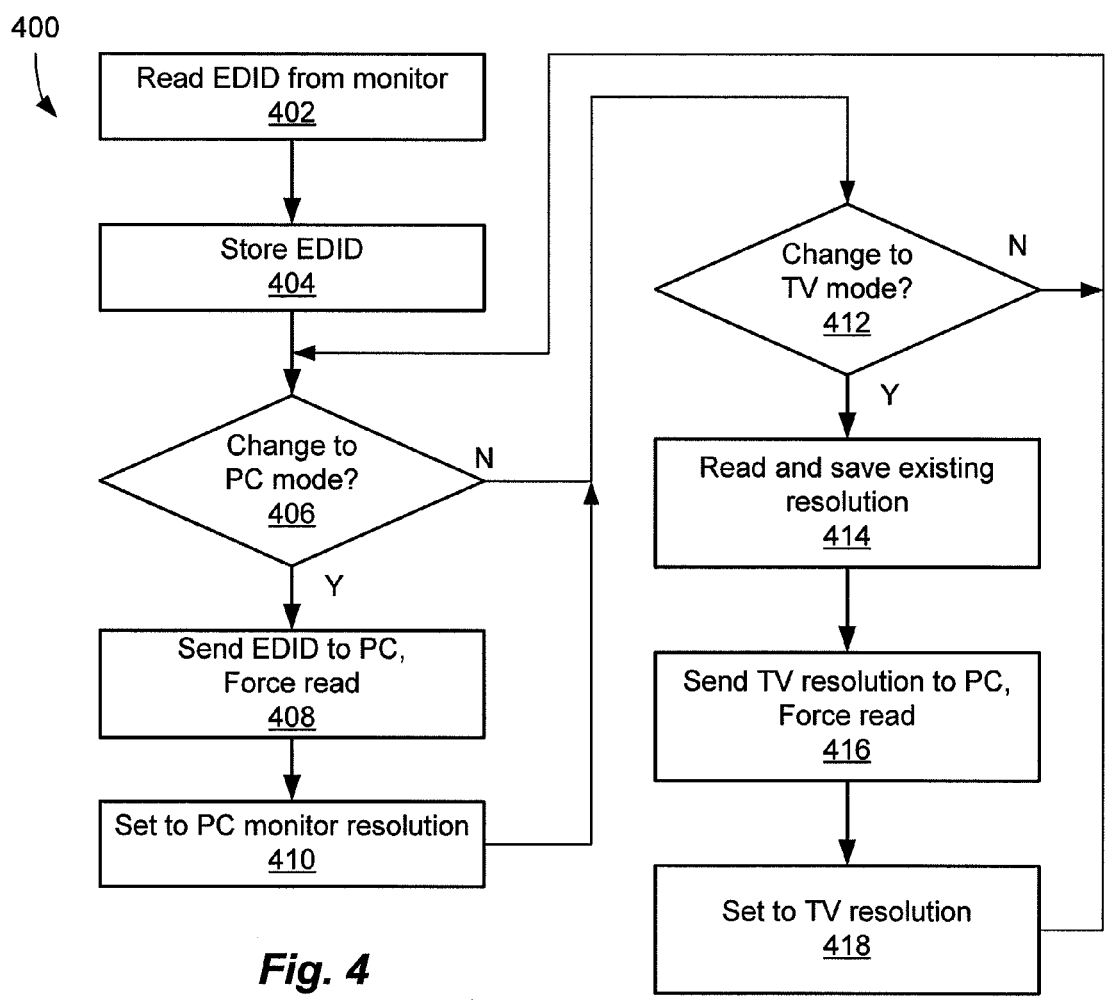
FIG. 4 is a flow diagram illustrating the method of mode switching of FIG. 3.

FIG. 4 depicts a flow chart 400 illustrating a process for a mode change. Step 402 shows the reading of the EDID from the monitor, such as PC display monitor 108. In step 404, the EDID is stored in controller 110, for later retrieval and use. Decision block 406 determines if a change to PC mode should be undertaken. The determination made in decision block 406 can be based on a detected input to the PC. If a mode change should occur, processing proceeds along the YES branch of decision block 406 to block 408, in which the EDID that was stored in block 404 is provided to PC 102. In addition, a command is provided to the PC in block 408 to cause the PC to read the EDID and change to the specified resolution. In block 410, the PC display is changed to the resolution indicated in the EDID supplied to the PC in block 408. Processing then proceeds to decision block 412, in which a determination is made whether a change to TV mode should be made. Decision block 412 is also reached on the NO branch from decision block 406.

If it is determined in decision block 412 that a change to TV mode should be made, processing proceeds along the YES branch of decision block 412 to block 414 in which the present video resolution is read and saved for further mode changing uses. In block 416, a resolution corresponding to TV mode is sent to the PC, and again a command is provided to the PC to force a read of the resolution. In block 418, the PC reads the new resolution, and changes the video resolution to the resolution suitable for use with the TV. Upon completing the mode change in block 418, processing returns to decision block 406 to detect whether another mode change should occur. Decision block 406 can also be reached from the NO branch of decision block 412. If no mode change is detected by decision block 406 or decision block 412, processing in flow chart 400 cycles between decision block 406 and 412 until a mode change prompt, such as an input from a respective device is detected.

Privacy Mode

In accordance with another exemplary embodiment of the disclosed system and method, controller 110 can be configured to provide a privacy mode, as selected by the user. Privacy mode acts like a one-way switch for video content delivered either to PC 102 or television 112 when enabled. For example, with privacy mode enabled, if controller 110 is in PC mode, the video resolution is set up for the video output of PC 102 to be displayed on PC display monitor 108, and privacy mode prevents the broadcast of the video to television 112. Similarly, when controller 110 is in TV mode, the video provided by PC 102 is directed to television 112, with the appropriate video resolution installed in PC 102, and display monitor 108 is turned off. In an exemplary embodiment, privacy mode is enabled as a default mode for system 100.

Optionally, controller 110 can cause PC display monitor 108 to display a message indicating that television 112 is active in TV mode, and no video is provided to display monitor 108. With such a message, a user approaching PC 102 can receive information regarding the mode of controller 110, rather than a blank screen on display monitor 108. Similarly, in PC mode, television 112 can receive a simple message or video indicating that PC mode is active in privacy mode so that no video is directed to television 112. Alternately, the channel for broadcast selected by video controller 110 can be turned off, so that television 112 receives no video that is produced by PC 102.

According to an exemplary embodiment, a setup screen is provided to PC 102 or television 112 to permit the user to configure controller 110 with respect to privacy mode. For example, the configuration display provided to PC 102 or television 112 can include check boxes for enabling or disabling privacy mode, or for causing respective display monitor 108 or television 112 to turn off or to display a given message when it is not selected in accordance with whether PC mode or TV mode is currently selected.

EDID Modulation for Over-Scan

HDTVs have a video display over-scan, in which an actual video display resolution is larger than the visible screen area. The concept of over-scan was originally implemented to stabilize an edge area of a video image for display prior to becoming visible on the actual display. If video taken from a PC video source is displayed on an HDTV screen, the entire over-scan area is used for the display by default, causing the display to be cropped so that a portion of the available video display is not visible in the actual display area of the HDTV screen.

According to an embodiment of the disclosed system and method, an over-scan compensation is provided to customize the display of PC video content for television 112. Under-scan is typically provided in terms of percentages of full screen resolution size. For instance, 85% of 720p is a resolution of 1088×612 or 15% under-scan. While some manufacturers call for 15% under-scan to work for almost all televisions (SDTV and HDTV), in practice such an under-scan often leaves black bars around the edges of the screen on most TVs. In accordance with the exemplary embodiment, the proposed under-scan compensation uses 15% under-scan as starting point for presentation to the user. Various tools are provided to permit the user to adjust and scale the video output displayed until the visible picture matches the actual dimensions of the television screen.

Over-scan compensation begins with the display of a calibration page to configure the custom under-scan resolution. The calibration page is initially sized as an interior rectangle with dimensions that attempt to match the visible picture with the actual screen size using 15% under-scan. The user is prompted to identify the top left corner and bottom right corner of the screen. That is, the user is prompted to fill the full actual screen with the visible picture. According to one aspect, a stepped control is provided to permit the user to expand the calibration page in a horizontal and a vertical direction, and move the page in a translational movement. Calibration is finished when the user has dragged the upper left corner of the rectangle to the top left of the actual area of the TV screen and dragged the lower right corner of the rectangle to the bottom right of the actual area of the TV screen. According to one aspect, a set of controls on a remote control provide the stepped controls used to adjust the rectangle.

Internally, controller 110 normalizes a dimension of the rectangle so that the aspect ratio of 16:9 is not altered and the target resolution is a factor of 8. Other target resolution factors may be used, such as factors of 16 or 32, which may help to simplify implementation. The resolution is identified by four pieces of information, the top left x and y coordinates and the width and height values. The x,y coordinates are offsets from 0,0 (top left corner). The x,y coordinates can help to identify or adjust the location from which input is obtained from ADC 210. Once the dimensions of the rectangle are established, the resulting resolution dimensions are used to request a specific, customized video resolution from PC 102. In addition, as discussed above, one or more customized video resolutions are merged with a standard HDTV video resolution and provided to PC 102 so that controller 110 can determine if the graphics card for PC 102 can support the different video resolutions. Moreover, providing a number of different video resolutions, including multiple over-scan resolutions, to PC 102 permits selection from among different available video resolutions. The video resolutions can be provided to PC 102 in the form of an EDID. With the customized video resolution available in PC 102, the entire PC display is visible on television 112, even if television 112 implements an under-scan configuration. According to one aspect, controller 110 constructs a custom EDID and writes the associated data into an EEPROM in display monitor 108 in accordance with the DDC standard. According to another aspect, the user is asked to verify the new resolution. If the user accepts the resolution, the specifics of the video resolution are stored for later use, in particular for mode switching between PC mode and TV mode.

According to an exemplary embodiment, controller 110 supports a number of televisions 112. Over-scan compensation is TV specific, so that support for multiple televisions stores TV specific resolutions for each television. In addition, or alternately, if the user changes video resolution of the HDTV, for example, from 720p to 1080i, the same or new customized video resolutions can be used. The user can be prompted to customize the video resolution for whichever video resolution mode is chosen for the HDTV.

As an example, the customized resolution information is in the following format:

X: integer, Y: integer, Height: integer, Width: integer

Using the above example of 15% of over-scan, with a video resolution of 1088×612, supplying such a video resolution to PC 102 works well with most video adapters operating in a windowed application environment. That is, once the customized video resolution is established, and an appropriate EDID is produced, providing the customized EDID to PC 102 causes PC 102 to provide the customized video resolution without additional configuration or scaling, for example. This facility avoids additional difficulties or challenges that may be encountered if customized display drivers were to be written for the customized video resolution, for example.

Audio Switching

According to another aspect of the disclosed system and method, a switch between modes such as PC mode or TV mode causes a redirection of the audio output available from PC 102. PC 102 outputs an audio signal to a single target at a time. In PC mode, the audio signal is directed to the PC speakers. In TV mode, the audio signal is directed to a USB device driver, and captured by controller 110 for mixing with an MPEG-2 video transport stream, in accordance with an ATSC specified AC3 (Audio Codec 3) encoding standard, also referred to as the Dolby Digital standard. The AC3 encoding standard provides for up to six audio channels, typically corresponding to different speaker locations. This audio encoding standard is also commonly referred to as 5.1 digital.

The broadcasting of video on television 112 calls for video supplied by PC 102 to have synchronized image and audio information. See position is maintained between image and audio information by providing a timestamp to both the image and audio information presented to controller 110. The timestamps are used to create MPEG-2 timestamps to synchronize audio and video streams as supported by the MPEG-2 standard. Television 112 synchronizes playback of image and audio in accordance with the timestamps applied to the streams.

PC 102 may also supply pulse code modulated (PCM) audio signals in addition to or as an alternative to 5.1 digital. To obtain an audio signal from PC 102, controller 110 supplies a Dolby Digital 5.1 device configuration to PC 102. The device configuration may appear in PC 102 as a USB headset, for example. To handle PCM audio signals, the audio driver in the device configuration can convert PCM to AC3. The audio driver can also convert other types of audio codec inputs, such as by using a standard DLL available, for example, in a Windows® environment. Alternately, conversion of PCM audio signals can be done within controller 110.

In accordance with an exemplary embodiment, controller 110 detects an input to either PC 102 or television 110, and causes a corresponding mode change to PC mode or TV mode, respectively. When controller 110 causes a mode change to PC mode, control signals are provided to the USB connection to cause PC 102 to remove a USB audio device associated with controller 110. When the USB audio device is removed, there is no longer an audio device presented to the PC for USB audio. When the USB audio device is removed, PC 102 defaults to the PC speakers as the target for audio output.

When controller 110 causes a mode change to TV mode, controller 110 installs a USB audio device using control commands provided to the USB port. Once the USB audio devices installed, PC 102 was presented with a USB digital audio device for audio output. The USB digital audio device is capable of carrying 5.1 digital, as discussed above.

The USB port in this instance operates as a composite device. Controller 110 generally presents itself as a serial device to PC 102 on the USB port. Presenting controller 110 as a serial device permits control and command signals to be exchanged between PC 102 and controller 110. When a USB audio device is also installed in PC 102, the resulting composite device performs several functions, including a provisioning of an audio signal to controller 110, and message passing by controller 110.

Some embodiments of PC 102 can present challenges in consistently implementing a USB audio device. Accordingly, another exemplary embodiment of the disclosed system and method provides for deleting or disabling all other audio devices in PC 102 prior to installing the USB audio device. In this embodiment, PC 102 has no discretion on the choice of an output audio device, since a single device is presented to PC 102 for audio output. Similarly, in a switch to PC mode, controller 110 deletes or disables the USB audio device and re-enables or installs the PC default audio output device as a sole choice for audio output by PC 102.

Output Picture Quality/Latency Scaling

In accordance with an exemplary embodiment of video system 100, dynamic control of the latency between television 112 and PC 102 (see FIG. 1), and, consequently, the output picture quality of television 112, is provided. High-definition (HD) digital encoding typically employs an MPEG encoding scheme, such as the MPEG-2 encoding scheme, which is computationally intensive. When MPEG-2 encoding is provided for encoding frames in a video input bit stream in real-time, such as that provided by controller 110 in accordance with an exemplary embodiment, the output picture quality of television 112 can be improved by analyzing a greater number of frames. In another embodiment, the output picture quality of television 112 can be improved by providing more analysis time per frame, which generally requires more frame buffering. The computationally intensive MPEG-2 encoding, coupled with either increased numbers of frames to analyze or an increased amount of time for analyzing the respective frames, can cause a high level of latency between television 112 and PC 102 as the video source. Such latency can be problematic if a user wishes to interact with the video display of television 112 to control PC 102, such as may occur with the use of a computer mouse communicably coupled to PC 102 for manipulating a cursor displayed on the video display.

In one embodiment, a remote control such as remote control 232 (see FIG. 2) may be employed to remotely control and manipulate, at PC 102, a cursor displayed on the video display of television 112. Typically, if a user is viewing video on the video display of television 112 without interaction with PC 102, a high level of latency may be acceptable and even desirable to permit a higher quality video output presentation. However, when controlling a cursor input that is fed back to the user in the form of a video output on the video display of television 112, a high level of latency between television 112 and PC 102 can render efforts to control movements of the cursor ineffective.

In accordance with an exemplary embodiment of the disclosed system and method, latency is reduced in the video transport channel between television 112 and PC 102 to permit video control features, such as features to control movements of a computer cursor on the video display of television 112, to be performed with little or no effective delay, as observed by the user. Such latency is reduced at the cost of reduced output picture quality for the video presented on the video display of television 112. In one embodiment, controller 110, in processing a video input bit stream, causes selected frames in the input bit stream to be dropped prior to MPEG-2 encoding and transmission, thereby maintaining a valid video signal with less computation. In this case, an audio signal associated with the video input bit stream can remain unmodified so that there is no interruption in the audio output provided at television 112. It is noted that encoding the audio signal represents a much less computationally intensive effort, so that leaving the audio signal unmodified does not significantly impact the latency in the video transport channel.

Accordingly, controller 110 is operative to process cursor inputs (and/or keyboard inputs) provided at PC 102 for display on the video display of television 112 via a control device, such as remote control 232, in a reduced latency environment. The latency measured from the output of the VGA adapter (or from the output of a component (RGB) video adapter) of PC 102 or any other suitable video source to the video display of television 112 is preferably in the range of 30-60 msec to provide a practical response time for the cursor and/or keyboard inputs to PC 102. When not processing computer cursor and/or keyboard inputs, controller 110 may allow the latency between television 112 and PC 102 to increase, thereby improving the output picture quality provided by television 112.

Figure 5A:
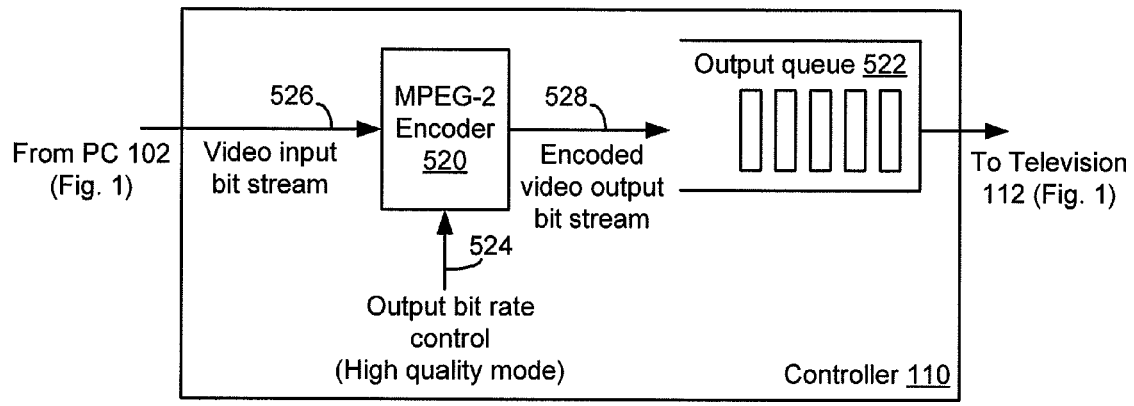
FIGS. 5a-5b are block diagrams illustrating the controller of FIG. 2, in which the controller is operative to control the latency between a television and a video source such as a personal computer included in the system of FIG. 1, and the output picture quality of the television, by providing more or less time to encode each frame in the video input bit stream.
Figure 5B:
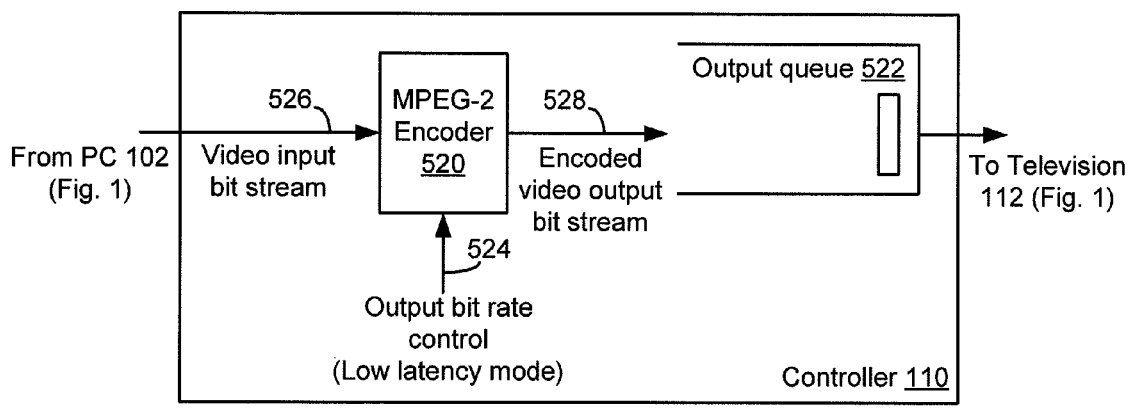

FIGS. 5a-5b depict an illustrative embodiment of controller 110 operative to control the latency between television 112 and PC 102, and the output picture quality of television 112, by providing more or less time to encode each frame in the video input bit stream. As shown in FIGS. 5a-5b, controller 110 includes MPEG-2 encoder 520 and output queue buffer 522. Under normal operating conditions, MPEG-2 encoder 520 can take a varying amount of time to encode each frame in the input bit stream. Some frames may take longer than an average frame interval to encode, while others may be encoded by MPEG-2 encoder 520 in a period of time shorter than the average frame interval. In the embodiment illustrated in FIGS. 5a-5b, the amount of time for encoding each frame is controlled via control input 524, which controls the output bit rate of the encoded video output bit stream produced by MPEG-2 encoder 520.

For example, FIG. 5a depicts controller 110 in a high output picture quality (high latency) mode in which an increased amount of frame buffering is provided at output queue buffer 522, thereby providing an increased amount of time for MPEG-2 encoder 520 to encode frames in the video input bit stream. As shown in FIG. 5a, MPEG-2 encoder 520 receives a video input bit stream including a plurality of frames at video input 526, and provides an encoded video output bit stream at an output bit rate to output queue buffer 522 via video output 528. Further, MPEG-2 encoder 520 receives a control input at control input 524 operative to control the output bit rate of the video output bit stream. In the illustrated embodiment, the maximum amount of time available to encode a frame (EncodeTimeMax) at MPEG-2 encoder 520 can be expressed as EncodeTimeMax<outputQueSize*frameInterval, in which "outputQueSize" corresponds to the size of output queue buffer 522, and "frameinterval" is the time interval between frames in the video input bit stream. In this example, output queue buffer 522 has a size of 5 frames, and the output bit rate is controlled such that a maximum of 5 frames are stored in output queue buffer 522 at any given time during the processing of the video input bit stream. The maximum amount of time available to encode a frame can therefore be expressed as EncodeTimeMax<5*frameInterval.

In the embodiment illustrated in FIG. 5a, the approximate amount of latency between television 112 and PC 102 in the high output picture quality mode can be expressed as Latency≈(outputQueSize+1)*frameInterval.

If exemplary output queue buffer 522 has a size of 5 frames, then outputQueSize is equal to 5, and Latency (5+1)*frameInterval, or Latency 6*frameInterval.

FIG. 5b depicts controller 110 in a low latency (low output picture quality) mode, in which a decreased amount of frame buffering is provided at output queue buffer 522, thereby providing a decreased amount of time for MPEG-2 encoder 520 to encode each frame in the video input bit stream. As in the embodiment illustrated in FIG. 5a, MPEG-2 encoder 520 of FIG. 5b receives the video input bit stream including a plurality of frames at video input 526, and provides the encoded video output bit stream at an output bit rate to output queue buffer 522 via video output 528. However, MPEG-2 encoder 520 receives a control input at control input 524 operative to reduce the output bit rate of the video output bit stream, thereby placing the MPEG-2 encoder 520 in the low latency mode. In the embodiment illustrated in FIG. 5b, the maximum amount of time available to encode a frame (EncodeTimeMax) at MPEG-2 encoder 520 can again be expressed as EncodeTimeMax<outputQueSize*frameInterval.

However, in this example, output queue buffer 522 now has a size of 1 frame, and the output bit rate is reduced such that no more than 1 frame is stored in output queue buffer 522 at any given time during the processing of the video input bit stream. The maximum amount of time available to encode a frame can therefore be expressed as EncodeTimeMax<1*frameInterval.

Moreover, the reduced amount of latency between television 112 and PC 102 in the low latency mode can be expressed as Latency≈(outputQueSize+1)*frameInterval, Latency≈(1+1)*frameInterval, or Latency≈2*frameInterval.

It is noted that the high output picture quality and low latency modes illustrated in FIGS. 5a-5b are described above as employing output queue buffer sizes of 5 and 1, respectively, for purposes of illustration only, and that any other suitable sizes for output queue buffer 522 of controller 110 may be employed.

As described above, MPEG-2 encoder 520 included in controller 110 receives respective control inputs at control input 524 to control the output bit rate of the encoded video output bit stream produced by the MPEG-2 encoder, thereby controlling the latency between television 112 and PC 102 and placing video system 100 in the high output picture quality mode or the low latency mode. In one embodiment, a control input corresponding to the quantization step-size used to encode the frames of the video input bit stream is employed to control the output bit rate of the video output bit stream, and, in turn, the latency between television 112 and PC 102 and the output picture quality of television 112.

Figure 6A:
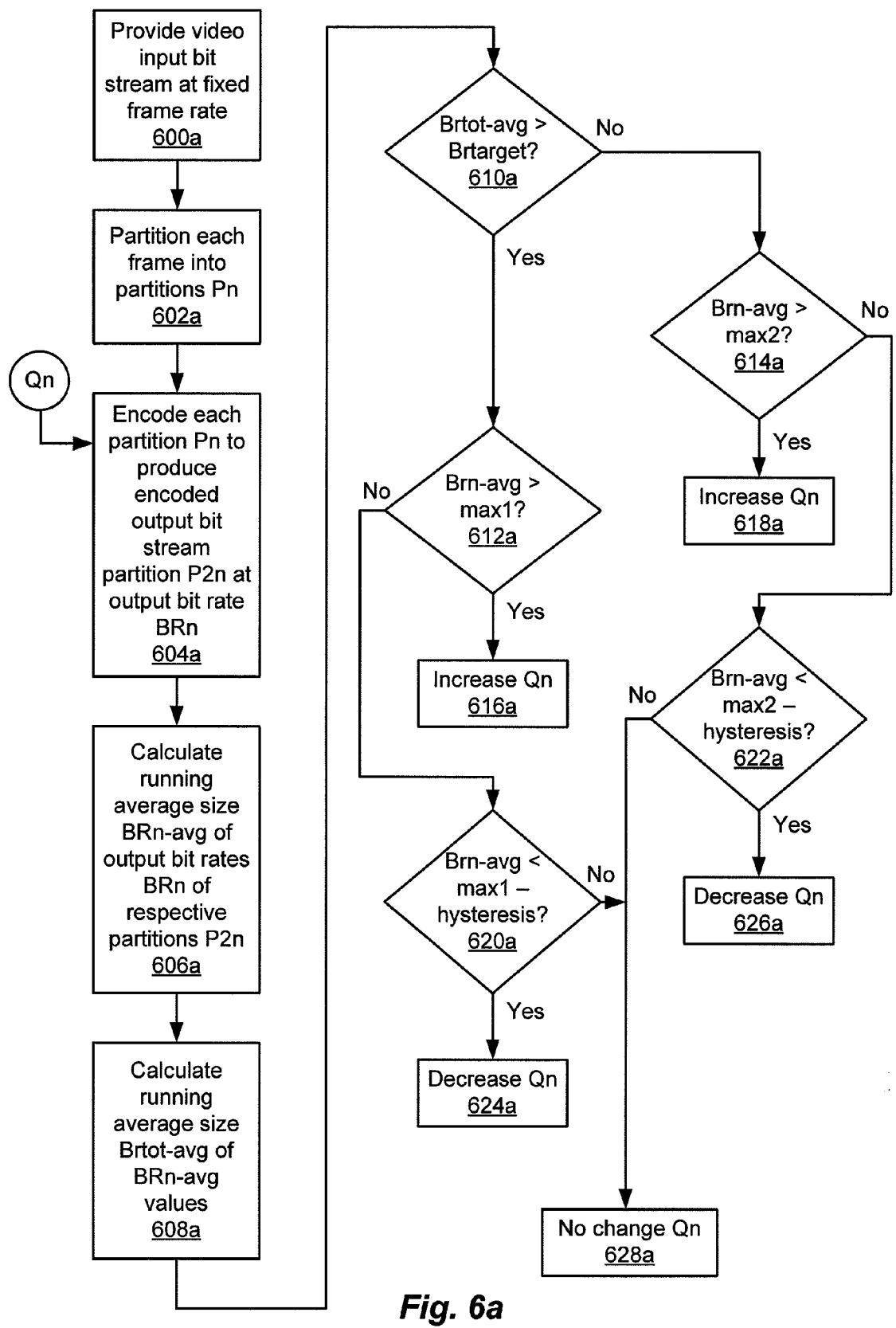
FIG. 6a is a flow diagram illustrating a method of dynamically controlling the output bit rate of an encoded video output bit stream produced by an MPEG-2 encoder within the controller of FIG. 2 by varying the quantization step-size Qn based on measurements of the running average size of the output bit rate.

FIGS. 6a-6d depict illustrative methods of controlling the output bit rate of the encoded video output bit stream produced by MPEG-2 encoder 520, and thus the latency between television 112 and PC 102 and the output picture quality of television 112, by adjusting the quantization step-size used by MPEG-2 encoder 520. For example, FIG. 6a depicts a method of dynamically controlling the output bit rate of the video output bit stream by adjusting the quantization step-size based on measurements of the running average size of the output bit rate. As depicted in step 600a, a video input bit stream including a plurality of frames is provided to the MPEG-2 encoder at a fixed input frame rate. As depicted in step 602a, each of the plurality of frames is partitioned into a plurality of input bit stream partitions Pn, which are non-overlapping blocks of pixel data. It is noted that, in the method of FIG. 6a, the MPEG-2 encoder produces the encoded video output bit stream at a variable output bit rate, while the fixed input frame rate of the video input bit stream is maintained substantially constant. For example, typical values of the input frame rate are 24 frames/sec, 30 frames/sec, 60 frames/sec, or any other suitable input frame rate.

As depicted in step 604a, the MPEG-2 encoder encodes each input bit stream partition Pn to produce a respective encoded output bit stream partition P2n at an output bit rate, BRn. It is noted that the encoding of each input bit stream partition Pn is performed using an adjustable quantization step-size Qn, which determines the average output bit rate, and, in turn, the latency between television 112 and PC 102 and the output picture quality of television 112. Moreover, the value of the quantization step-size Qn remains substantially constant during the encoding of each input bit stream partition Pn.

Next, as depicted in step 606a, the running average size, BRn-avg, of the output bit rates BRn of the respective encoded output bit stream partitions P2n is calculated. Further, as depicted in step 608a, the running average size, BRtot-avg, of the BRn-avg values for the entire encoded video output bit stream is calculated. A determination is then made at step 610a as to whether the running average size BRtot-avg is greater than a specified target bit rate, BRtarget. If so, then another determination is made at step 612a as to whether the running average size BRn-avg is greater than a specified upper bit rate limit, maxi, for the respective encoded output bit stream partition P2n. If so, then the quantization step-size Qn is increased a predetermined amount to decrease the output bit rate BRn, as depicted in step 616a, thereby reducing the level of latency between television 112 and PC 102 and the output picture quality of television 112.

Otherwise, if the running average size BRn-avg is not greater than the specified upper bit rate limit maxi for the respective encoded output bit stream partition P2n, then a further determination is made at step 620a as to whether the running average size BRn-avg is less than the specified upper bit rate limit maxi minus a predetermined amount for hysteresis. If so, then the quantization step-size Qn is decreased a predetermined amount to increase the output bit rate BRn, as depicted in step 624a, thereby raising the level of latency between television 112 and PC 102 and the output picture quality of television 112.

Next, if the running average size BRtot-avg is not greater than the target bit rate BRtarget, then a determination is made at step 614a as to whether the running average size BRn-avg is greater than a specified lower bit rate limit, max2, for the respective encoded output bit stream partition P2n. If so, then the quantization step-size Qn is increased to decrease the output bit rate BRn, as depicted in step 618a, thereby reducing the level of latency between television 112 and PC 102 and the output picture quality of television 112. Otherwise, a determination is made at step 622a as to whether the running average size BRn-avg is less than the specified lower bit rate limit max2 minus a predetermined amount for hysteresis. If so, then the quantization step-size Qn is decreased to increase the output bit rate BRn, as depicted in step 626a, thereby raising the level of latency between television 112 and PC 102 and the output picture quality of television 112. Otherwise, if the running average size BRn-avg is not less than the specified upper bit rate limit maxi minus the predetermined amount for hysteresis, and is not less than the specified lower bit rate limit max2 minus the predetermined amount for hysteresis, then the quantization step-size Qn remains unchanged, as depicted in step 628a.

Figure 6B:
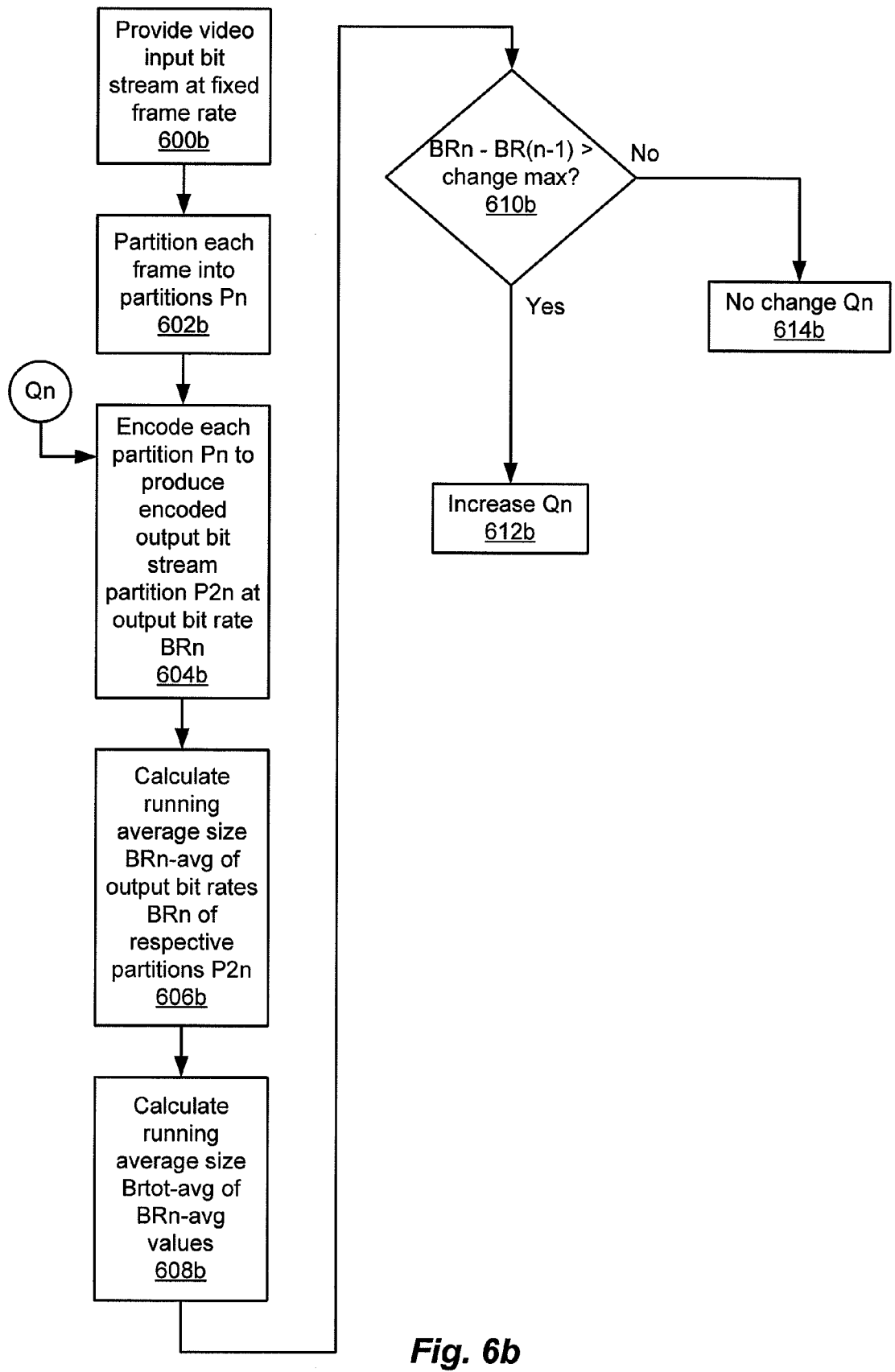
FIG. 6b is a flow diagram illustrating a method of dynamically controlling the output bit rate of the encoded video output bit stream produced by the MPEG-2 encoder of FIG. 6a by varying the quantization step-size Qn based on measurements of one or more increases in the output bit rate.

FIG. 6b depicts a method of dynamically controlling the output bit rate of the encoded video output bit stream produced by MPEG-2 encoder 520 by adjusting the quantization step-size based on the measurement of one or more increases in the output bit rate BRn. As depicted in step 600b, a video input bit stream including a plurality of frames is provided to the MPEG-2 encoder at a fixed input frame rate. As depicted in step 602b, each of the plurality of frames is partitioned into a plurality of input bit stream partitions Pn. In the method of FIG. 6b, the MPEG-2 encoder produces the encoded video output bit stream at a variable encoded output bit rate, while the fixed input frame rate of the video input bit stream is maintained substantially constant.

As depicted in step 604b, the MPEG-2 encoder encodes each input bit stream partition Pn to produce a respective encoded output bit stream partition P2n at an output bit rate, BRn. It is noted that the encoding of each input bit stream partition Pn is performed using an adjustable quantization step-size Qn, which determines the average output bit rate, and, in turn, the output picture quality of television 112. Moreover, the value of the quantization step-size Qn remains substantially constant during the encoding of each input bit stream partition Pn.

Next, as depicted in step 606b, the running average size, BRn-avg, of the output bit rates BRn of the respective encoded output bit stream partitions P2n is calculated. Further, as depicted in step 608b, the running average size, BRtot-avg, of the BRn-avg values for the entire encoded video output bit stream is calculated. A determination is then made at step 610b as to whether the difference in the encoded output bit rates BRn, BR(n−1) of the encoded output bit stream partitions P2n, P2(n−1) is greater than a predetermined maximum change in the encoded output bit rate, "change max". If so, then the quantization step-size Qn is increased a predetermined amount to decrease the encoded output bit rate BRn, as depicted in step 612b, thereby reducing the output picture quality of television 112. Otherwise, the quantization step-size Qn remains unchanged, as depicted in step 614b.

Figure 6C:
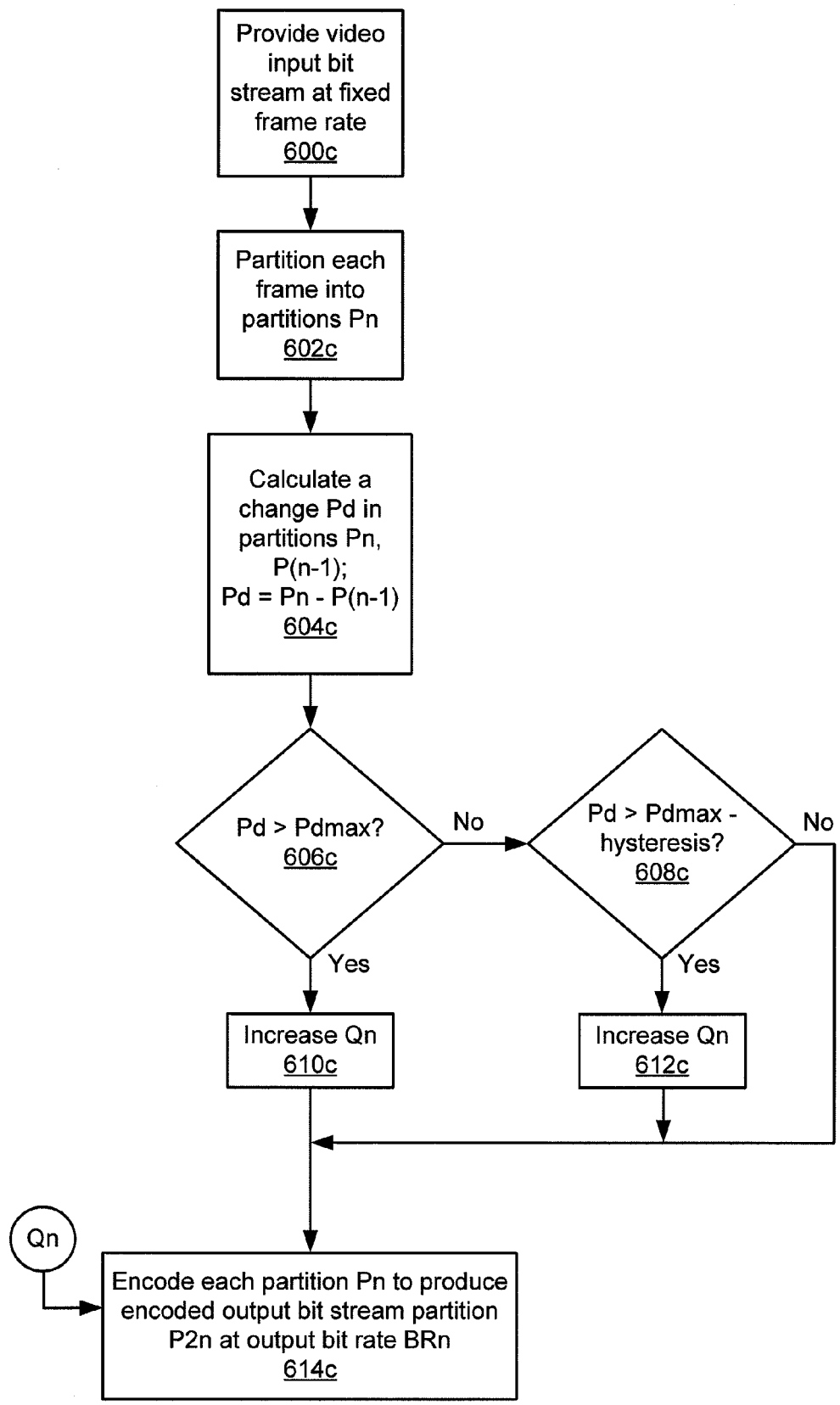
FIG. 6c is a flow diagram illustrating a method of dynamically controlling the output bit rate of the encoded video output bit stream produced by the MPEG-2 encoder of FIG. 6a by varying the quantization step-size Qn based on measurements of changes in the frames included in the video input bit stream.

FIG. 6c depicts a method of dynamically controlling the output bit rate of the video output bit stream produced by MPEG-2 encoder 520 by adjusting the quantization step-size based on an analysis of changes in the frames included in the video input bit stream. For example, such changes in the frames can be indicative of motion depicted in the respective frames, which, in general, does not require a high level of output picture quality. As depicted in step 600c, a video input bit stream including a plurality of frames is provided to the MPEG-2 encoder at a fixed input frame rate. As depicted in step 602c, each of the plurality of frames is partitioned into a plurality of input bit stream partitions Pn. In the method of FIG. 6c, the MPEG-2 encoder produces the encoded video output bit stream at a variable output bit rate, while the fixed input frame rate of the video input bit stream is maintained substantially constant.

Next, as depicted in step 604c, a change, Pd, in the input bit stream partitions Pn, P(n−1) is determined by calculating the difference between the pixel data contained in the respective partitions Pn, P(n−1), specifically, Pd=Pn−P(n−1). A determination is then made at step 606c as to whether the change Pd is greater than a predetermined maximum change, Pdmax. If so, then the quantization step-size Qn is increased a predetermined amount to decrease the output bit rate BRn, as depicted in step 610c, thereby reducing the output picture quality of television 112, and the method continues to step 614c. Otherwise, a determination is made at step 608c as to whether the change Pd is greater than the predetermined maximum change Pdmax minus a predetermined amount of hysteresis. If so, then the quantization step-size Qn is increased a predetermined amount to decrease the output bit rate BRn, as depicted in step 612c, thereby reducing the output picture quality of television 112, and the method continues to step 614c. Otherwise, if the change Pd is not greater than the predetermined maximum change Pdmax minus the predetermined amount of hysteresis, then the quantization step-size Qn remains unchanged. At step 614c, the MPEG-2 encoder encodes each input bit stream partition Pn to produce a respective encoded output bit stream partition P2n at an output bit rate, BRn, using the quantization step-size Qn.

Figure 6D:
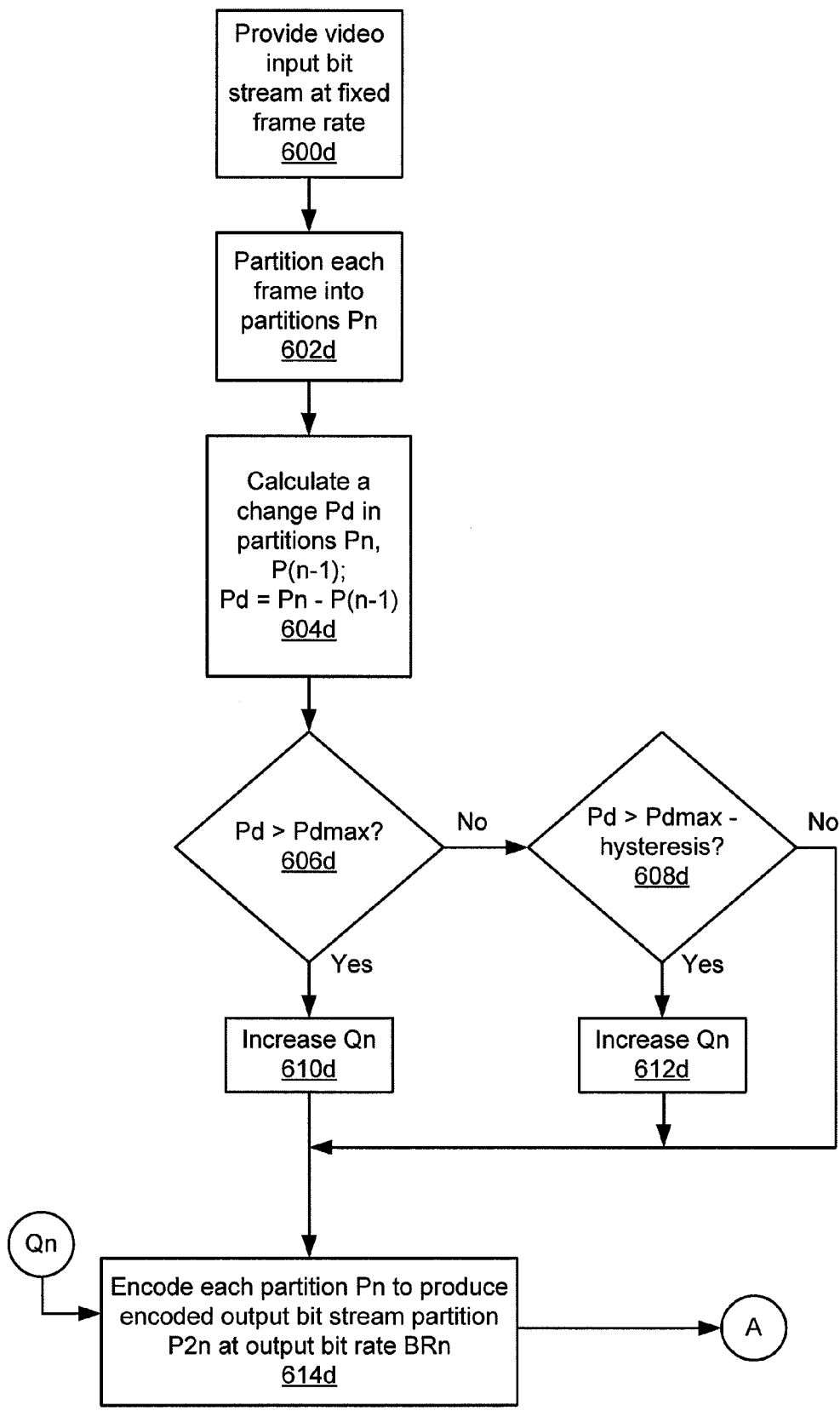
FIGS. 6d-6e are a flow diagram illustrating a method of dynamically controlling the output bit rate of the encoded video output bit stream produced by the MPEG-2 encoder of FIG. 6a by varying the quantization step-size Qn based on measurements of both the running average size of the output bit rate and the changes in the frames included in the video input bit stream.
Figure 6E:
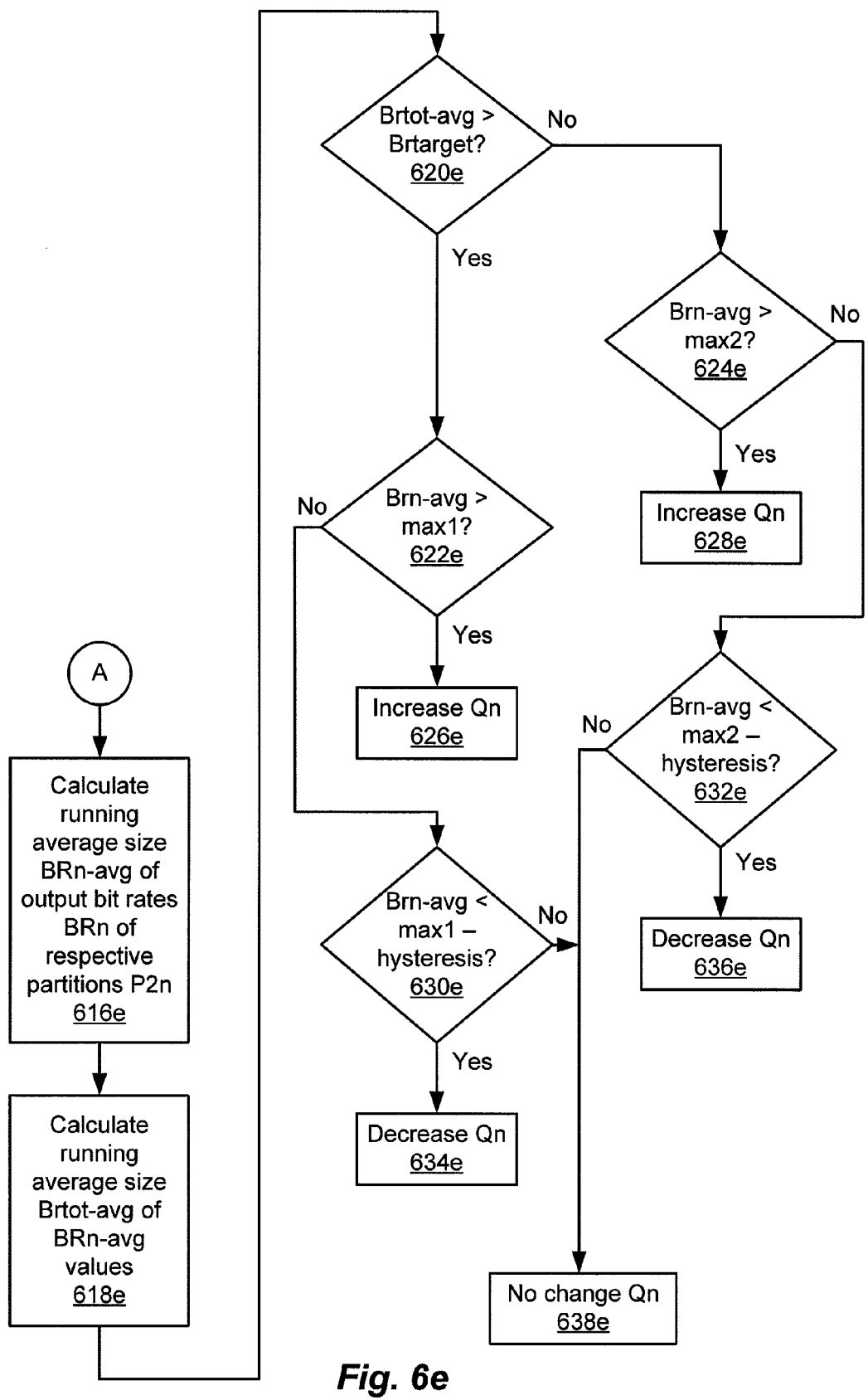

FIGS. 6d-6e depict a method of dynamically controlling the output bit rate of the video output bit stream produced by MPEG-2 encoder 520 by adjusting the quantization step-size based on measurements of both the running average size of the output bit rate and the analysis of changes in the frames included in the video input bit stream. As depicted in step 600d, a video input bit stream including a plurality of frames is provided to the MPEG-2 encoder at a fixed input frame rate. As depicted in step 602d, each of the plurality of frames is partitioned into a plurality of input bit stream partitions Pn. In the method of FIG. 6d, the MPEG-2 encoder produces the encoded video output bit stream at a variable output bit rate, while the fixed input frame rate of the video input bit stream is maintained substantially constant.

Next, the method of FIG. 6d continues with steps 604d, 606d, 608d, 610d, 612d, and 614d, which generally correspond to steps 604c, 606c, 608c, 610c, 612c, and 614c, respectively, of the method of FIG. 6c, which perform the function of dynamically controlling the output bit rate of the video output bit stream produced by MPEG-2 encoder 520 by adjusting the quantization step-size Qn based on the measurements of the changes in the frames included in the video input bit stream, and the function of encoding each input bit stream partition Pn using the quantization step-size Qn to produce a respective encoded output bit stream partition P2n at an output bit rate, BRn. Moreover, the method of FIG. 6d continues with steps 616e, 618e, 620e, 622e, 624e, 626e, 628e, 630e, 632e, 634e, 636e, and 638e, which generally correspond to steps 606a, 608a, 610a, 612a, 614a, 616a, 618a, 620a, 622a, 624a, 626a, and 628a, respectively, of the method of FIG. 6a, which perform the function of further dynamically controlling the output bit rate of the video output bit stream produced by MPEG-2 encoder 520 by adjusting the quantization step-size Qn based on the measurements of the running average size of the output bit rate of the encoded video output bit stream. As discussed above, such adjustment of the quantization step-size used by MPEG-2 encoder 520 can be performed to dynamically control the output picture quality of television 112.

In an alternative embodiment, a control input corresponding to the frame encoding type used to encode the frames of the video input bit stream is employed to control the output bit rate of the encoded video output bit stream produced by MPEG-2 encoder 520, and, in turn, the output picture quality of television 112.

Figure 7A:
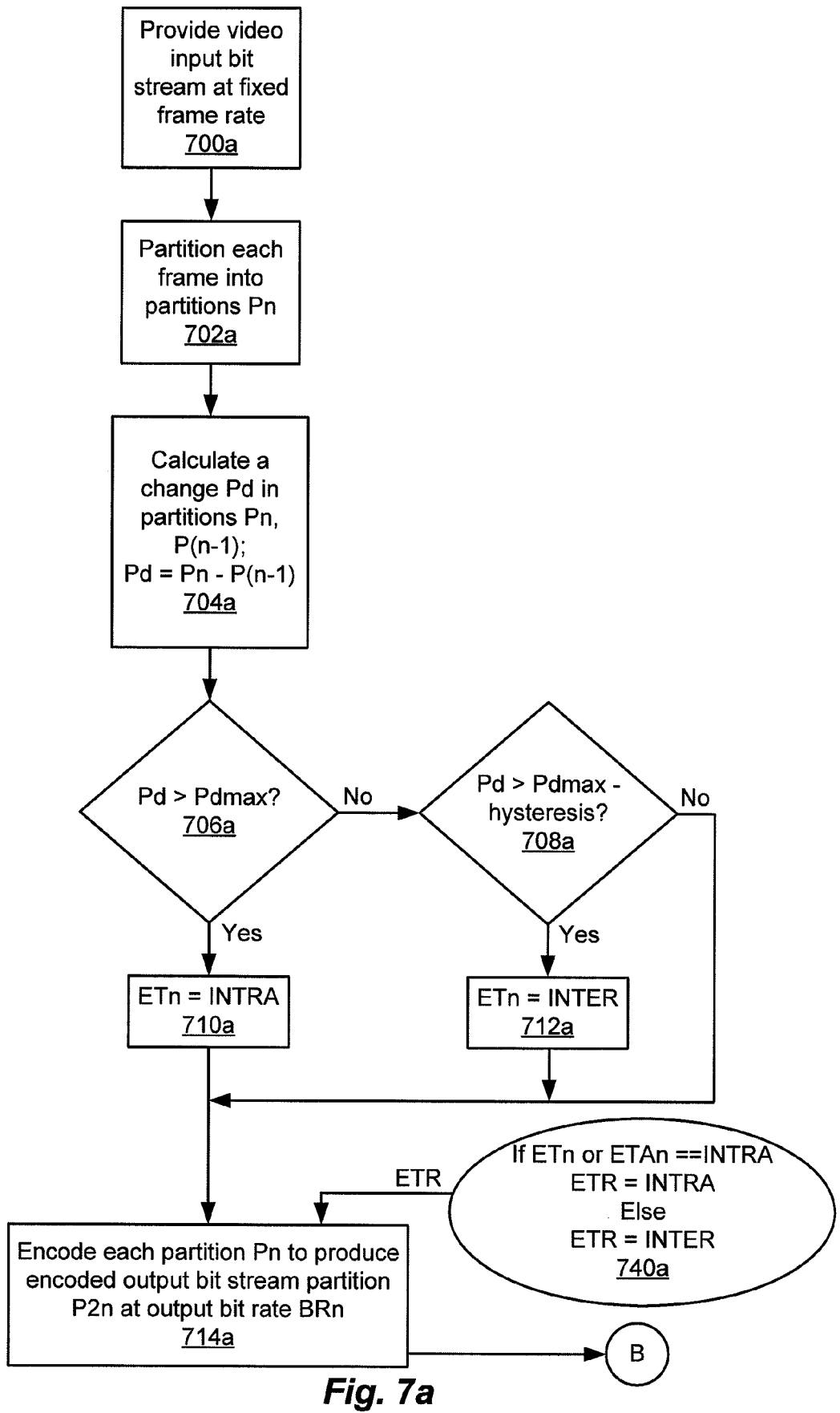
FIGS. 7a-7b are a flow diagram illustrating a method of dynamically controlling the output bit rate of the encoded video output bit stream produced by the MPEG-2 encoder of FIG. 6a by varying the frame encoding type based on measurements of both the running average size of the output bit rate and the changes in the frames included in the video input bit stream.
Figure 7B:
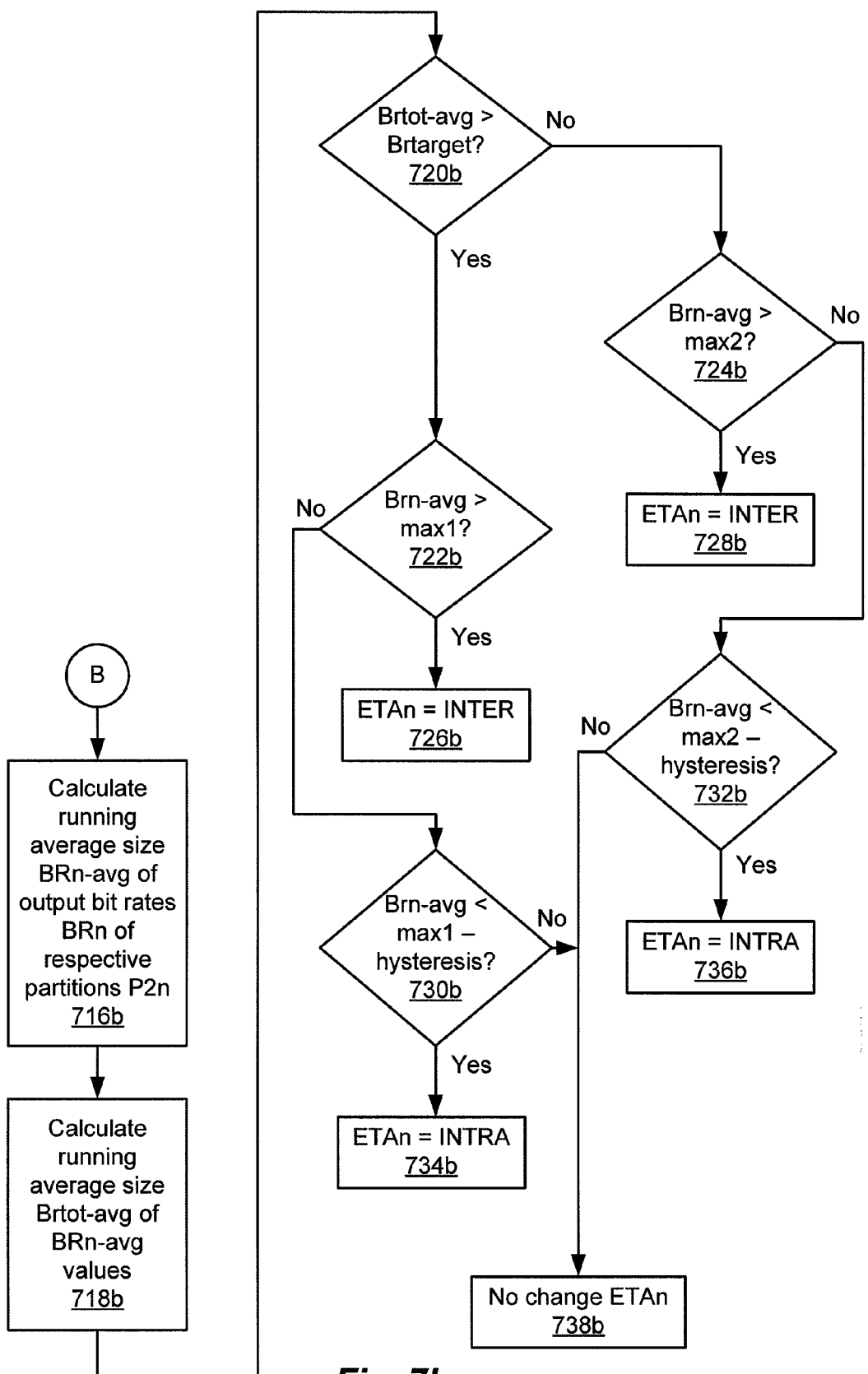

FIGS. 7a-7b depict a method of dynamically controlling the output bit rate of the encoded video output bit stream produced by MPEG-2 encoder 520 by adjusting the frame encoding type based on measurements of both the running average size of the output bit rate and the analysis of changes in the frames included in the video input bit stream. Those of ordinary skill in this art will appreciate that for MPEG-compliant encoding, the frame encoding types can include I-frames, P-frames, and B-frames. Specifically, the I-frames are "intra-coded" frames used primarily for random access or scene update, and the P-frames are "inter-coded" frames that employ forward motion predictive coding with reference to previously coded I-frames or P-frames. The B-frames are also regarded as inter-coded frames, however these frames employ both forward and backward motion predictive/interpolative coding with reference to previously coded I-frames or P-frames.

As depicted in step 700a, a video input bit stream including a plurality of frames is provided to the MPEG-2 encoder at a fixed input frame rate. As depicted in step 702a, each of the plurality of frames is partitioned into a plurality of input bit stream partitions Pn. In the method of FIG. 7, the MPEG-2 encoder produces the encoded video output bit stream at a variable output bit rate, while the fixed input frame rate of the video input bit stream is maintained substantially constant.

Next, as depicted in step 704a, a change, Pd, in the input bit stream partitions Pn, P(n−1) is determined by calculating the difference between the pixel data contained in the respective partitions Pn, P(n−1), specifically, Pd=Pn−P(n−1). A determination is then made at step 706a as to whether the change Pd is greater than a predetermined maximum change, Pdmax. If so, then a frame encoding type ETn, referred to herein as the "input frame encoding type", is set to intra-coding (INTRA), as depicted in step 710a. Otherwise, a determination is made at step 708a as to whether the change Pd is greater than the predetermined maximum change Pdmax minus a predetermined amount of hysteresis. If so, then the input frame encoding type ETn is set to inter-coding (INTER), as depicted in step 712a, and the method continues to step 714a. Otherwise, if the change Pd is not greater than the predetermined maximum change Pdmax minus the predetermined amount of hysteresis, then the input frame encoding type ETn remains unchanged. For example, the input frame encoding type may remain at an initial setting of intra-coding (INTRA).

As depicted in step 714a, the MPEG-2 encoder encodes each input bit stream partition Pn to produce a respective encoded output bit stream partition P2n at an output bit rate, BRn. It is noted that the encoding of each input bit stream partition Pn is performed using an adjustable frame encoding type, ETR, which determines the average output bit rate, and, in turn, the output picture quality of television 112. It is further noted that the frame encoding type ETR remains unchanged during the encoding of each input bit stream partition Pn. The determination of the frame encoding type ETR is discussed in detail below.

Next, as depicted in step 716b, the running average size, BRn-avg, of the output bit rates BRn of the respective encoded output bit stream partitions P2n is calculated. Further, as depicted in step 718b, the running average size, BRtot-avg, of the BRn-avg values for the entire encoded video output bit stream is calculated. A determination is then made at step 720b as to whether the running average size BRtot-avg is greater than a specified target bit rate, BRtarget. If so, then another determination is made at step 722b as to whether the running average size BRn-avg is greater than a specified upper bit rate limit, maxi, for the respective encoded output bit stream partition P2n. If so, then a frame encoding type ETAn, referred to herein as the "output frame encoding type", is set to inter-coding (INTER), as depicted in step 726b. Otherwise, if the running average size BRn-avg is not greater than the specified upper bit rate limit maxi for the respective encoded output bit stream partition P2n, then a further determination is made at step 730b as to whether the running average size BRn-avg is less than the specified upper bit rate limit maxi minus a predetermined amount for hysteresis. If so, then the output frame encoding type ETAn is set to intra-coding (INTRA), as depicted in step 734b.

Next, if the running average size BRtot-avg is not greater than the target bit rate BRtarget, then a determination is made at step 724b as to whether the running average size BRn-avg is greater than a specified lower bit rate limit, max2, for the respective encoded output bit stream partition P2n. If so, then the output frame encoding type ETAn is set to inter-coding (INTER), as depicted in step 728b. Otherwise, a determination is made at step 732b as to whether the running average size BRn-avg is less than the specified lower bit rate limit max2 minus a predetermined amount for hysteresis. If so, then the output frame encoding type ETAn is set to intra-coding (INTRA), as depicted in step 736b. Otherwise, if the running average size BRn-avg is not less than the specified upper bit rate limit maxi minus the predetermined amount for hysteresis, and is not less than the specified lower bit rate limit max2 minus the predetermined amount for hysteresis, then the output frame encoding type ETAn remains unchanged. For example, the output frame encoding type may remain at an initial setting of intra-coding (INTRA).

As depicted in step 740a, if either the input frame encoding type ETn or the output frame encoding type ETAn is set to intra-coding (INTRA), then the frame encoding type ETR used by the MPEG-2 encoder is set to intra-coding (INTRA). As a result, the respective input bit stream partition Pn is encoded by the MPEG-2 encoder as an I-frame. Otherwise, the frame encoding type ETR used by the MPEG-2 encoder is set to inter-coding (INTER). As a result, the respective input bit stream partition Pn is encoded by the MPEG-2 encoder as a P-frame (or a B-frame).

Those of ordinary skill in this art will appreciate that the function of intra-coding a frame (or a partition of a frame) as an I-frame involves the full encoding of the respective frame, whereas the function of inter-coding a frame as a P-frame (or a B-frame) involves the differential encoding of the respective frame based on previously coded I-frames and/or P-frames. With regard to intra-coding, the resulting I-frame therefore includes all of the information for that I-frame, while the P-frame (or the B-frame) produced by inter-coding includes information relating to the differences between that P-frame (or B-frame) and one or more previously coded I-frames and/or P-frames. Because an output bit stream partition P2n intra-coded as an I-frame contains more information than an output bit stream partition P2n inter-coded as a P-frame (or a B-frame), the frame encoding type ETR set to intra-coding causes the output bit rate BRn to increase, thereby raising the output picture quality of television 112. Moreover, the frame encoding type ETR set to inter-coding causes the output bit rate BRn to decrease, thereby reducing the output picture quality of television 112.

Figure 8A:
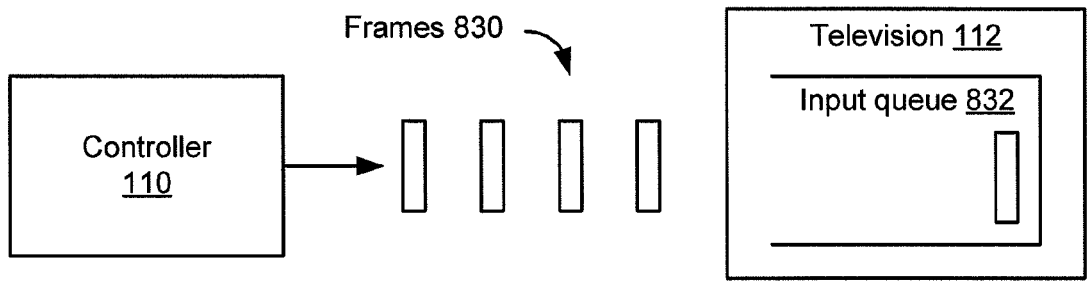
FIGS. 8a-8c are block diagrams illustrating the controller of FIG. 2 and the television of FIGS. 5a-5b, in which the controller is operative to control the level of latency between the television and the personal computer of FIGS. 5a-5b, and the output picture quality of the television, by providing more or less time to encode each frame in the video input bit stream.
Figure 8B:
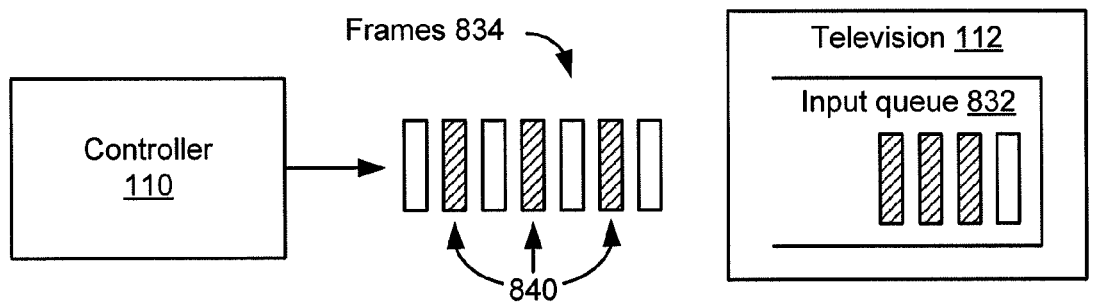
Figure 8C:
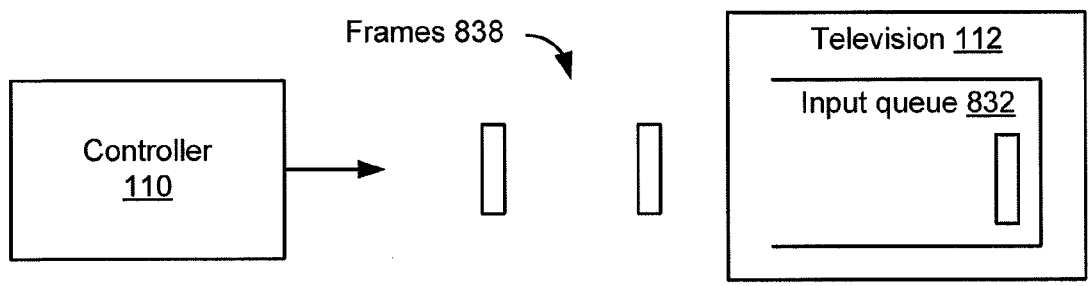

FIGS. 8a-8c depict an alternative embodiment of controller 110 operative to control the level of latency between television 112 and PC 102, and the output picture quality of television 112, by providing more or less time to encode each frame in the video input bit stream. In this embodiment, controller 110 sends some frames faster than an average frame rate through the video transport channel, causing the number of frames in input queue buffer 832 to build up on television 112. By sending the frames to television 112 at an increased rate, controller 110 and, in particular, DSP 14, can take longer than a frame interval to encode a given frame. If controller 110 provides frames to television 112 at the frame display rate of television 112, then the number of frames at any given time in input queue buffer 832 of television 112 does not change. If the number of frames in input queue buffer 832 of television 112 is increased, then the level of latency between television 112 and PC 102 and the output picture quality of television 112 is raised. If the number of frames in input queue buffer 832 of television 112 is decreased, then the level of latency between television 112 and PC 102 and the output picture quality of television 112 is reduced.

For example, FIG. 8a depicts controller 110 and television 112, which includes input queue buffer 832. As shown in FIG. 8a, controller 110 sends a plurality of frames 830 in an encoded video output bit stream through the video transport channel to input queue buffer 832 at an average frame rate, FRavg. In the embodiment illustrated in FIG. 8a, if controller 110 transmits frames 830 at an average frame rate FRavg equal to the frame display rate of television 112, then the number of frames in input queue buffer 832 remains at, for example, 1 frame.

To raise the level of latency between television 112 and PC 102 and the output picture quality of television 112, the number of frames in input queue buffer 832 of television 112 is increased. FIG. 8b depicts controller 110 sending a plurality of frames 834 in an encoded video output bit stream through the video transport channel to input queue buffer 832 at a frame rate that is increased for a predetermined time period above the average frame rate FRavg, thereby making the arrival rate of frames 834 at input queue buffer 832 greater than the frame display rate of television 112. In one embodiment, a specified number of inter-coded frames 840 are included in the encoded output bit stream sent to television 112, without specifying in the frame information any differences between the inter-coded P-frame (or B-frame) and one or more previously coded I-frames and/or P-frames. For example, the specified number of inter-coded frames 840 may be included in the output bit stream with 1-3 actual frames disposed between successive inter-coded frames 840. As a result, in the illustrative embodiment of FIG. 8b, the number of frames in input queue buffer 832 of television 112 increases to 4 frames. It is noted that the level of buffering in input queue buffer 832 of television 112 is typically less than 5-8 frames.

To reduce the level of latency between television 112 and PC 102 and the output picture quality of television 112, the number of frames in input queue buffer 832 of television 112 is decreased. It is noted that the act of draining the frame buffer of television 112 does not necessarily represent a problem for video display on television 112, since once the frame buffer in television 112 is drained, television 112 can automatically slow down the display rate. Television 112 can also have a variable frame display rate to display some frames faster than others, so that gauging a number of frames in the frame buffer of television 112 can be somewhat inexact.

FIG. 8c depicts controller 110 sending a plurality of frames 834 in an encoded video output bit stream through the video transport channel to input queue buffer 832 of television 112 at a frame rate that is decreased for a predetermined time period below the average frame rate FRavg. In one embodiment, a specified number of frames in the encoded output bit stream are dropped over the predetermined time period. For example, a specified number of frames (e.g., 1-3 frames) in the output bit stream may be dropped at specified intervals within the predetermined time period to achieve a target frame rate below the average frame rate FRavg. As a result, the arrival rate of frames 834 at input queue buffer 832 of television 112 is less than frame display rate of television 112, and the number of frames in input queue buffer 832 is decreased, e.g., from 4 frames to 1 frame.

It is noted that, because television 112 may increase the level of buffering in input queue buffer 832 on its own accord, it may be necessary to decrease the frame rate at controller 110 periodically using one or more of the above-described techniques to maintain a desired reduced level of latency between television 112 and PC 102. It is further noted that the high output picture quality and low latency modes of video system 100, as described above with reference to FIGS. 8a-8c, may employ input queue buffer sizes of 1-4 frames or any other suitable buffer size.

Once the frame buffer of television 112 is reduced to a smaller number of frames sufficient to reduce the overall latency between the VGA output (or the component (RGB) output) of PC 102 and the video display of television 112, the effect of cursor and/or keyboard inputs provided at PC 102 can be observed on the video display of television 112 with an acceptable amount of delay. Such reduced latency permits the user to provide cursor and/or keyboard inputs at PC 102, and to observe the resulting video activity on the video display of television 112, while providing an effective control loop for the user.

Various criteria can be used to transition out of the low latency mode and into the high output picture quality mode where the frame rate provided by controller 110 can be increased. For example, a mode change to high output picture quality mode can occur if no user input has been detected at PC 102 for a certain time interval, such as, for example, five seconds or any other suitable time interval. Moreover, the type of user input may be used as an indication for a mode change, for example, maintaining the low latency mode with the detection of cursor inputs, and increasing the output picture quality with pushbutton inputs, such as may be provided in activating a pushbutton control displayed on the video display of television 112. The low latency mode can also be maintained indefinitely until the occurrence of a given event, such as a selection provided by the user to return to high output picture quality mode. Transitions between the low latency mode and the high output picture quality mode may occur over approximately 10-15 frame intervals, for example, which may match an expected buffer frame quantity during operation in a normal, high output picture quality mode.

As described above, output picture quality of television 112 versus latency between television 112 and PC 102 can be adjusted on a dynamic basis. For example, observed computer mouse activities at PC 102 can cause the output picture quality of television 112 to decrease rapidly with an attendant decrease in latency between television 112 and PC 102. Further, the decrease in output picture quality and latency can be maintained until the occurrence of a particular event, such as the expiration of a specified time interval from the last observed computer mouse event. Alternately, or in addition, if a limited number of computer mouse events are observed, then the output picture quality of television 112 can be increased to a point at which the limited mouse activity can be accommodated with an acceptable level of latency within the above described range. If limited or no computer mouse events are observed at PC 102 for a given period of time, the output picture quality of television 112 can be increased, either rapidly or gradually, until the output picture quality is restored or another computer mouse event is observed.

It is noted that mode switching between the high output picture quality mode and the low latency mode can be achieved in the form of a state machine. For example, the low latency mode as a state can be entered when an input provided by a device associated with television 112 (e.g., the PC 102) is detected. Similarly, the high output picture quality mode may be entered when no television-associated device input is received for greater than five seconds, for example.

The operations herein described are purely exemplary and imply no particular order. Further, the operations can be used in any sequence when appropriate and can be partially used. With the above embodiments in mind, it should be understood that the presently disclosed invention can employ various computer-implemented operations involving data transferred or stored in computer systems. These operations are those requiring physical manipulation of physical quantities. Usually, though not necessarily, these quantities take the form of electrical, magnetic, or optical signals capable of being stored, transferred, combined, compared, and otherwise manipulated.

Any of the operations described herein that form part of the presently disclosed invention are useful machine operations.

The disclosed invention also relates to a device or an apparatus for performing these operations. The apparatus can be specially constructed for the required purpose, or the apparatus can be a general-purpose computer selectively activated or configured by a computer program stored in the computer. In particular, various general-purpose machines employing one or more processors coupled to one or more computer readable medium, described below, can be used with computer programs written in accordance with the teachings herein, or it may be more convenient to construct a more specialized apparatus to perform the required operations.

The presently disclosed system and method can also be embodied as computer readable code on a computer readable medium. The computer readable medium is any data storage device that can store data, which can thereafter be read by a computer system. Examples of the computer readable medium include hard drives, read-only memory (ROM), random-access memory (RAM), CD-ROMs, CD-Rs, CD-RWs, magnetic tapes, and other optical and non-optical data storage devices. The computer readable medium can also be distributed over a network-coupled computer system so that the computer readable code is stored and executed in a distributed fashion.

The foregoing description has been directed to particular embodiments of the presently disclosed invention. It will be apparent, however, that other variations and modifications may be made to the described embodiments, with the attainment of some or all of their advantages. The procedures, processes, and/or modules described herein may be implemented in hardware, software, embodied as a computer-readable medium having program instructions, firmware, or a combination thereof. For example, the functions described herein may be performed by a processor executing program instructions out of a memory or other storage device.

It will be further appreciated by those of ordinary skill in the art that modifications to and variations of the above-described system and method of dynamically modifying video and coding behavior may be made without departing from the inventive concepts disclosed herein. Accordingly, the invention should not be viewed as limited except as by the scope and spirit of the appended claims.

What is claimed is:

1. A method of dynamically controlling a video display apparatus that includes a frame buffer which is configured to receive frames, the method comprising:
    receiving a plurality of input frames in a video input stream;
    encoding the plurality of input frames in the video input stream to generate a plurality of output frames;
    transmitting a first portion of the plurality of output frames at a first output frame rate to the video display apparatus, wherein the video display apparatus displays buffered frames at a display frame rate and the first output frame rate is approximately equal to the display frame rate such that a number of frames in the frame buffer remains relatively constant at a first number;
    while transmitting the first portion of the plurality of output frames at the first output frame rate, detecting at least one user input;
    in response to detecting the at least one user input, transmitting, for a predetermined period of time, a second portion of the plurality of output frames at a second output frame rate to the video display apparatus, wherein the second output frame rate is less than the display frame rate such that the number of frames in the frame buffer is reduced to a second number that is less than the first number; and
    in response to expiration of the predetermined period of time, transmitting a third portion of the plurality of output frames at the first output frame rate to the video display apparatus such that the number of frames in the frame buffer remains relatively constant at the second number.

2. The method of claim 1, further comprising periodically transmitting, for the predetermined period of time, additional portions of the plurality of output frames at the second output frame rate to the video display apparatus to maintain the number of frames in the frame buffer at the second number.

3. The method of claim 1, wherein the predetermined period of time is a first predetermined period of time, and the method further comprises, in response to detecting an absence of user input for a second predetermined period of time, transmitting, for a third predetermined period of time, a fourth portion of the plurality of output frames at a third output frame rate to the video display apparatus, wherein the third output frame rate is greater than the display frame rate such that the number of frames in the frame buffer is increased to a third number that is greater than the second number.

4. The method of claim 3, wherein transmitting the fourth portion of the plurality of output frames at the third output frame rate includes adding at least one additional frame to the fourth portion of the plurality of output frames, the at least one additional frame being an inter-coded frame which indicates no difference between the at least one additional frame and one or more previous frames.

5. The method of claim 3, wherein transmitting for the third predetermined period of time includes transmitting for a period approximately equal to a period of ten to fifteen frame intervals.

6. The method of claim 1, wherein the predetermined period of time is a first predetermined period of time, and the method further comprises:
    while transmitting the third portion of the plurality of output frames at the first output frame rate, detecting at least one pushbutton input; and
    in response to detecting the at least one pushbutton input, transmitting, for a third predetermined period of time, a fourth portion of the plurality of output frames at a third output frame rate to the video display apparatus, wherein the third output frame rate is greater than the display frame rate such that the number of frames in the frame buffer is increased to a third number that is greater than the second number.

7. The method of claim 1, wherein transmitting the second portion of the plurality of output frames at the second output frame rate includes dropping input frames from the plurality of input frames prior to encoding.

8. The method of claim 1, wherein detecting the at least one user input includes detecting at least one of: an indication of mouse movement, input from a keyboard, and input from a remote control device.

9. The method of claim 1, wherein an output frame of the third portion of the plurality of output frames is displayed with less delay between a time when the output frame is transmitted and a time when the output frame is displayed than an output frame of the first portion of the plurality of output frames.

10. The method of claim 1, wherein transmitting the portions of the plurality of output frames includes transmitting the portions of the plurality of output frames via a local area connection.

11. The method of claim 10, wherein transmitting the portions of the plurality of output frames via the local area connection includes transmitting the portions of the plurality of output frames over a coaxial cable connection.

12. The method of claim 1, wherein transmitting the third portion of the plurality of output frames includes transmitting output frames which display a cursor.

13. A method of dynamically controlling a video display apparatus that includes a frame buffer which is configured to receive frames, the method comprising:
- receiving a plurality of input frames in a video input stream;
- encoding the plurality of input frames in the video input stream to generate a plurality of output frames;
- transmitting a first portion of the plurality of output frames at a first output frame rate to the video display apparatus, wherein the video display apparatus displays buffered frames at a display frame rate and the first output frame rate is approximately equal to the display frame rate such that a number of frames in the frame buffer remains relatively constant at a first number;
- in response to detecting an absence of user input for a first predetermined period of time, transmitting, for a second predetermined period of time, a second portion of the plurality of output frames at a second output frame rate to the video display apparatus, wherein the second output frame rate is greater than the display frame rate such that the number of frames in the frame buffer is increased to a second number that is greater than the first number; and
- in response to expiration of the second predetermined period of time, transmitting a third portion of the plurality of output frames at the first output frame rate to the video display apparatus such that the number of frames in the frame buffer remains relatively constant at the second number.

14. The method of claim 13, wherein transmitting for the second predetermined period of time includes transmitting for a period approximately equal to a period of ten to fifteen frame intervals.

15. The method of claim 13, wherein transmitting the second portion of the plurality of output frames at the second output frame rate includes adding at least one additional frame to the second portion of the plurality of output frames, the at least one additional frame being an inter-coded frame which indicates no difference between the at least one additional frame and one or more previous frames.

16. The method of claim 13, further comprising:
- detecting at least one user input;
- in response to detecting the at least one user input, transmitting, for a third predetermined period of time, a fourth portion of the plurality of output frames at a third output frame rate to the video display apparatus, wherein the third output frame rate is less than the display frame rate such that the number of frames in the frame buffer is reduced to a third number that is less than the second number; and
- in response to expiration of the third predetermined period of time, transmitting a fifth portion of the plurality of output frames at the first output frame rate to the video display apparatus such that the number of frames in the frame buffer remains relatively constant at the third number.

17. The method of claim 16, further comprising periodically transmitting, for the third predetermined period of time, additional portions of the plurality of output frames at the third output frame rate to the video display apparatus to maintain the number of frames in the frame buffer at the third number.

18. The method of claim 16, further comprising, when transmitting the fourth portion of the plurality of output frames at the third output frame rate, dropping input frames from the plurality of input frames prior to encoding.

19. The method of claim 16, wherein detecting the at least one user input includes detecting at least one of: an indication of mouse movement, input from a keyboard, and input from a remote control device.

20. The method of claim 16, wherein transmitting the fifth portion of the plurality of output frames includes transmitting output frames which display a cursor.

21. The method of claim 13, wherein transmitting the portions of the plurality of output frames includes transmitting the portions of the plurality of output frames via a local area connection.

22. The method of claim 21, wherein transmitting the portions of the plurality of output frames via the local area connection includes transmitting the portions of the plurality of output frames over a coaxial cable connection.

23. A method of dynamically controlling a video display apparatus that includes a frame buffer which is configured to receive frames, the method comprising:
- receiving a plurality of input frames in a video input stream;
- encoding the plurality of input frames in the video input stream to generate a plurality of output frames;
- transmitting a first portion of the plurality of output frames at a first output frame rate to the video display apparatus, wherein the video display apparatus displays buffered frames at a display frame rate and the first output frame rate is approximately equal to the display frame rate such that a number of frames in the frame buffer remains relatively constant at a first number;
- while transmitting the first portion of the plurality of output frames at the first output frame rate, detecting at least one pushbutton input;
- in response to detecting at least one pushbutton input, transmitting, for a predetermined period of time, a second portion of the plurality of output frames at a second output frame rate to the video display apparatus, wherein the second output frame rate is greater than the display frame rate such that the number of frames in the frame buffer is increased to a second number that is greater than the first number; and
- in response to expiration of the predetermined period of time, transmitting a third portion of the plurality of output frames at the first output frame rate to the video display apparatus such that the number of frames in the frame buffer remains relatively constant at the second number.

24. The method of claim 23, wherein transmitting the second portion of the plurality of output frames at the second output frame rate includes adding at least one additional frame to the second portion of the plurality of output frames, the at least one additional frame being an inter-coded frame which indicates no difference between the at least one additional frame and one or more previous frames.

25. A method of dynamically controlling a video display apparatus that includes a frame buffer which is configured to receive frames, the method comprising:
- receiving a plurality of input frames in a video input stream;
- encoding the plurality of input frames in the video input stream to generate a plurality of output frames;
- transmitting a first portion of the plurality of output frames at a first output frame rate to the video display apparatus, wherein the video display apparatus displays buffered frames at a display frame rate and the first output frame rate is approximately equal to the display frame rate such that a number of frames in the frame buffer remains relatively constant at a first number;

while transmitting the first portion of the plurality of output frames at the first output frame rate, detecting an indication of mouse movement;

in response to detecting the indication of mouse movement, transmitting, for a first predetermined period of time, a second portion of the plurality of output frames at a second output frame rate to the video display apparatus, wherein the second output frame rate is less than the display frame rate such that the number of frames in the frame buffer is reduced to a second number that is less than the first number;

in response to expiration of the first predetermined period of time, transmitting a third portion of the plurality of output frames at the first output frame rate to the video display apparatus such that the number of frames in the frame buffer remains relatively constant at the second number;

while transmitting the third portion of the plurality of output frames at the second output frame rate, detecting at least one pushbutton input; and in response to detecting the at least one pushbutton input, transmitting, for a second predetermined period of time, a fourth portion of the plurality of output frames at a third output frame rate to the video display apparatus, wherein the third output frame rate is greater than the display frame rate such that the number of frames in the frame buffer is increased to a third number that is greater than the second number.

26. An apparatus for dynamically controlling a video display apparatus that includes a frame buffer which is configured to receive frames, the apparatus comprising at least one processor; and at least one memory including computer program code, the at least one processor being operative to execute code to:

receive a plurality of input frames in a video input stream;
encode the plurality of input frames in the video input stream to generate a plurality of output frames;
transmit a first portion of the plurality of output frames at a first output frame rate to the video display apparatus, wherein the video display apparatus displays buffered frames at a display frame rate and the first output frame rate is approximately equal to the display frame rate such that a number of frames in the frame buffer remains relatively constant at a first number;

detect at least one user input while transmitting the first portion of the plurality of output frames at the first output frame rate;

in response to detecting the at least one user input, transmit, for a first predetermined period of time, a second portion of the plurality of output frames at a second output frame rate to the video display apparatus, wherein the second output frame rate is less than the display frame rate such that the number of frames in the frame buffer is reduced to a second number that is less than the first number;

in response to expiration of the first predetermined period of time, transmit a third portion of the plurality of output frames at the first output frame rate to the video display apparatus such that the number of frames in the frame buffer remains relatively constant at the second number; and in response to detecting an absence of user input for a second predetermined period of time, transmit, for a third predetermined period of time, a fourth portion of the plurality of output frames at a third output frame rate to the video display apparatus, wherein the third output frame rate is greater than the display frame rate such that the number of frames in the frame buffer is increased to a third number that is greater than the second number.

27. The apparatus of claim 26, wherein the at least one processor is further operative to execute code to, while transmitting the fourth portion of the plurality of output frames at the third output frame rate, add at least one additional frame to the fourth portion of the plurality of output frames, the at least one additional frame being an inter-coded frame which indicates no difference between the at least one additional frame and one or more previous frames.

* * * * *